(12) United States Patent
Wang et al.

(10) Patent No.: US 10,814,485 B2
(45) Date of Patent: Oct. 27, 2020

(54) DEVICE, SYSTEM, AND METHOD FOR AUTOMATICALLY GENERATING MOTION PATH OF ROBOT

(71) Applicant: FANUC CORPORATION, Minamitsuru-gun, Yamanashi (JP)

(72) Inventors: Kaimeng Wang, Yamanashi (JP); Wenjie Chen, Yamanashi (JP); Kouichirou Hayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 334 days.

(21) Appl. No.: 15/947,281

(22) Filed: Apr. 6, 2018

(65) Prior Publication Data

US 2018/0290302 A1 Oct. 11, 2018

(30) Foreign Application Priority Data

Apr. 10, 2017 (JP) .................................. 2017-077711

(51) Int. Cl.
*G06F 17/00* (2019.01)
*B25J 9/16* (2006.01)

(52) U.S. Cl.
CPC .......... *B25J 9/1664* (2013.01); *B25J 9/1633* (2013.01); *B25J 9/1697* (2013.01)

(58) Field of Classification Search
CPC ....... B25J 9/1664; B25J 9/1633; B25J 9/1697
USPC .......................................................... 700/253
See application file for complete search history.

(56) References Cited

U.S. PATENT DOCUMENTS

| | | | |
|---|---|---|---|
| 6,654,666 B1 | 11/2003 | Terada | |
| 7,324,873 B2 | 1/2008 | Nagatsuka et al. | |
| 7,720,573 B2* | 5/2010 | Yamada | B25J 19/023 |
| | | | 700/245 |
| 7,979,161 B2 | 7/2011 | Nihei et al. | |
| 8,194,929 B2* | 6/2012 | Koike | G03B 15/00 |
| | | | 356/4.1 |
| 8,319,831 B2* | 11/2012 | Koike | G01B 11/03 |
| | | | 348/86 |
| 8,582,121 B2* | 11/2013 | Koike | B25J 9/1697 |
| | | | 356/620 |

(Continued)

FOREIGN PATENT DOCUMENTS

| | | |
|---|---|---|
| CN | 1868690 A | 11/2006 |
| CN | 104203503 A | 12/2014 |

(Continued)

*Primary Examiner* — Ronnie M Mancho
(74) *Attorney, Agent, or Firm* — RatnerPrestia

(57) ABSTRACT

A device that can prevent a decrease in an efficiency of a manufacturing line. The device includes a shape acquisition section for acquiring a shape of a workpiece; a motion pattern acquisition section for acquiring basic motion patterns including a reference workpiece shape, a reference working position in the reference workpiece shape, and a type of an operation carried out on the reference working position; a similarity determination section for determining whether a shape of the workpiece is similar to the reference work piece shape; a position determination section for, based on a shape of the workpiece and the reference workpiece shape, determining the working position on the workpiece that corresponds to the reference working position; and an motion-path generation section for, by changing the reference working position to the determined working position, generating a motion path.

8 Claims, 17 Drawing Sheets

(56) References Cited

U.S. PATENT DOCUMENTS

| | | | |
|---|---|---|---|
| 8,688,274 B2 * | 4/2014 | Shieh | B25J 9/1692 700/245 |
| 8,886,359 B2 * | 11/2014 | Inaba | B25J 9/163 700/245 |
| 9,110,466 B2 * | 8/2015 | Yanagawa | G05B 19/42 |
| 9,239,234 B2 * | 1/2016 | Aoba | G01B 11/2518 |
| 9,517,563 B2 * | 12/2016 | Watanabe | B25J 9/1607 |
| 9,904,271 B2 * | 2/2018 | Hayata | B25J 9/1682 |
| 10,500,668 B2 * | 12/2019 | Yoshida | B23K 9/287 |
| 2005/0102060 A1 * | 5/2005 | Watanabe | B25J 9/1697 700/245 |
| 2007/0083291 A1 | 4/2007 | Nagatsuka et al. | |
| 2013/0223724 A1 * | 8/2013 | Wersborg | B23K 28/02 382/152 |
| 2015/0019011 A1 | 1/2015 | Namba et al. | |
| 2015/0117753 A1 | 4/2015 | Chang et al. | |
| 2017/0032281 A1 * | 2/2017 | Hsu | G06N 5/04 |

FOREIGN PATENT DOCUMENTS

| | | |
|---|---|---|
| CN | 104570940 A | 4/2015 |
| DE | 102010015031 A1 | 11/2010 |
| JP | 07311613 A | 11/1995 |
| JP | 08-90232 A | 4/1996 |
| JP | H09244724 A | 9/1997 |
| JP | 2000075910 A | 3/2000 |
| JP | 2004243215 A | 9/2004 |
| JP | 2006343975 A | 12/2006 |
| JP | 2007108916 A | 4/2007 |
| JP | 2009172608 A | 8/2009 |
| JP | 2012091304 A | 5/2012 |
| JP | 2014194656 A | 10/2014 |
| JP | 2016110536 A | 6/2016 |

\* cited by examiner

FIG. 5A
FIG. 5B
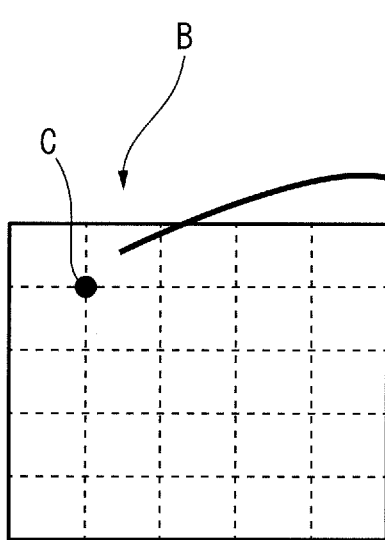
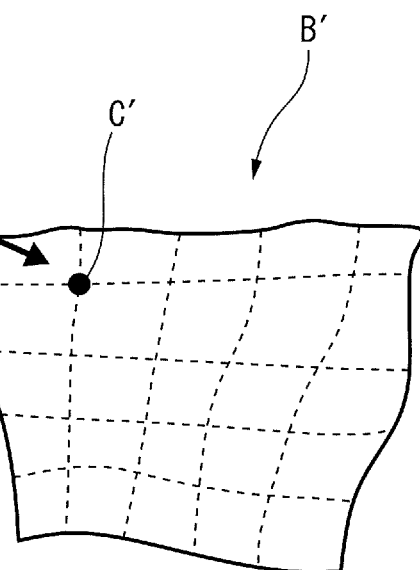
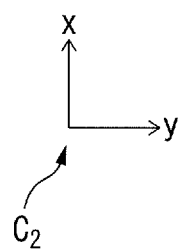

| | | WORK | | |
|---|---|---|---|---|
| | | GRIP | SPOT WELDING | ARC WELDING |
| SHAPE OF WORKPIECE | RECTANGULAR |  130 |  132 |  134 |
| | CIRCULAR |  136 |  138 |  140 |
| | TRIANGULAR |  142 |  144 |  146 |
| | LINEAR |  148 |  150 |  152 |

US 10,814,485 B2

DEVICE, SYSTEM, AND METHOD FOR AUTOMATICALLY GENERATING MOTION PATH OF ROBOT

CROSS-REFERENCE TO RELATED APPLICATION

This application is a new U.S. Patent Application that claims benefit of Japanese Patent Application No. 2017-077711, filed Apr. 10, 2017, the disclosure of this application is being incorporated herein by reference in its entirety for all purposes.

BACKGROUND OF THE INVENTION

1. Field of the Invention

The invention relates to a device, a system, and a method for automatically generating a motion path of a robot.

2. Description of the Related Art

A technique for automatically generating a motion path of a robot is known (e.g., Japanese Unexamined Patent Publication (Kokai) No. 8-90232).

Conventionally, each time a shape of a workpiece is changed even slightly, there is a need to teach motions again to a robot who operates the changed workpiece, and this leads to a decrease in an efficiency of a manufacturing line.

SUMMARY OF INVENTION

In an aspect of the present disclosure, a device configured to automatically generate a motion path of a robot, includes a shape acquisition section configured to acquire a shape of a workpiece to be processed by a robot; a motion pattern acquisition section configured to acquire a basic motion pattern including a reference workpiece shape, a reference working position in the reference workpiece shape, and a type of work onto the reference working position; a similarity determination section configured to determine whether the shape of the workpiece acquired by the shape acquisition section is similar to the reference workpiece shape included in the basic motion patterns; a position determination section configured to determine a working position in the workpiece that corresponds to the reference working position included in the basic motion patterns, based on the shape of the workpiece and the reference workpiece shape determined to be similar by the similarity determination section; and an motion-path generation section configured to generate a motion path for the robot to carry out the work included in the basic motion patterns onto the working position, by changing the reference working position to the working position determined by the position determination section.

In another aspect of the present disclosure, a method of automatically generating a motion path of a robot, includes acquiring a shape of a workpiece to be processed by a robot; acquiring a basic motion pattern including a reference workpiece shape, a reference working position in the reference workpiece shape, and a type of work onto the reference working position; determining whether the acquired shape of the workpiece is similar to the reference workpiece shape included in the basic motion patterns; determining the working position in the workpiece that corresponds to the reference working position included in the basic motion patterns, based on the shape of the workpiece and the reference workpiece shape determined to be similar; and generating a motion path for the robot to carry out the work included in the basic motion pattern onto the working position, by changing the reference working position to the determined working position.

According to an aspect of the present disclosure, the motion bath, when the robot operates the workpiece, can be automatically structured using the basic motion patterns without teaching the robot again. Accordingly, a burden applied to re-teaching of the robot is reduced, and thus, the efficiency of the manufacturing line can be improved.

BRIEF DESCRIPTION OF THE DRAWINGS

The objects, features and advantages of the invention will be more apparent from the following description of embodiments with reference to the appended drawings.

FIG. 5A and FIG. 5B are drawings for explaining a mapping theory.

DETAILED DESCRIPTION

Figure 1:
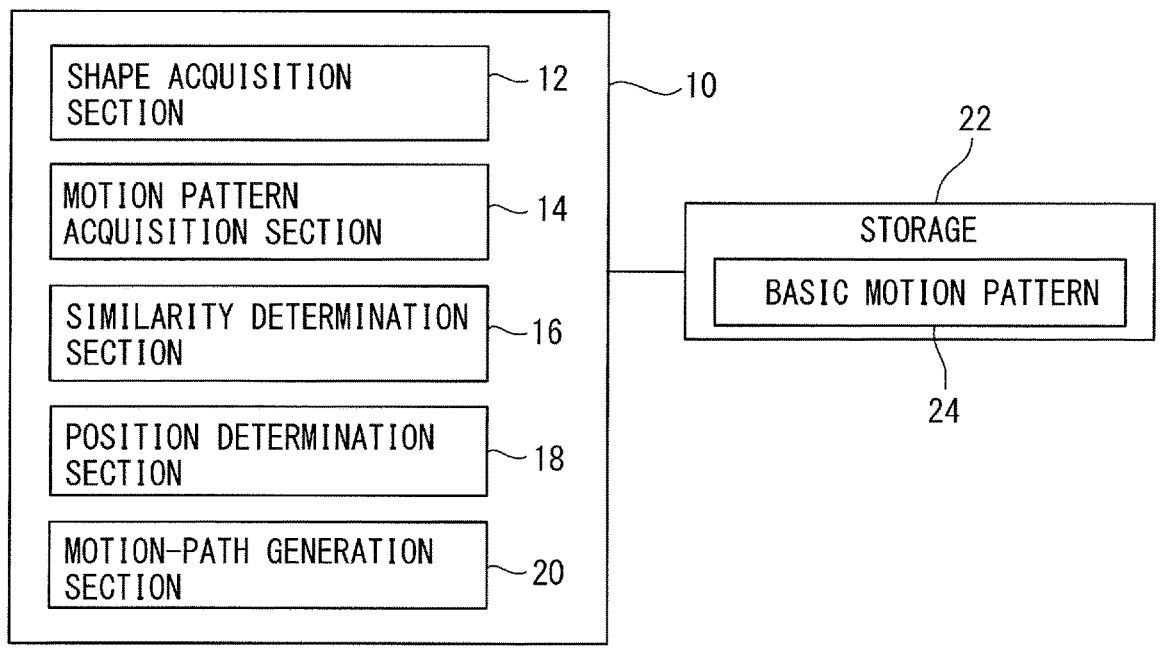
FIG. 1 is a block diagram of a device according to one embodiment.

Embodiments of the present disclosure are described in details below with reference to drawings. Note that, in various embodiments described below, similar elements are assigned the same reference numerals, and repetitive descriptions thereof will be omitted. First, with reference to FIG. 1, device 10 according to an embodiment is described.

The device 10 is configured to automatically generate a motion path of a robot, and includes a shape acquisition section 12, a motion pattern acquisition section 14, a similarity determination section 16, a position determination section 18, and a motion-path generation section 20. The device 10 may be comprised of a single computer including a CPU, a memory, etc. Alternatively, each of the shape acquisition section 12, the motion pattern acquisition section 14, the similarity determination section 16, the position determination section 18, and the motion-path generation section 20 may be comprised of a single computer including a CPU, a memory, etc.

In this embodiment, a storage 22 provided outside of the device 10 pre-stores a basic motion pattern 24. The basic motion pattern 24 is a computer program including information on a reference workpiece shape, a reference working position in the reference workpiece shape, and a type of work onto the reference working position, and causes the robot to carry out a predetermined work onto the reference working position.

Figure 2:
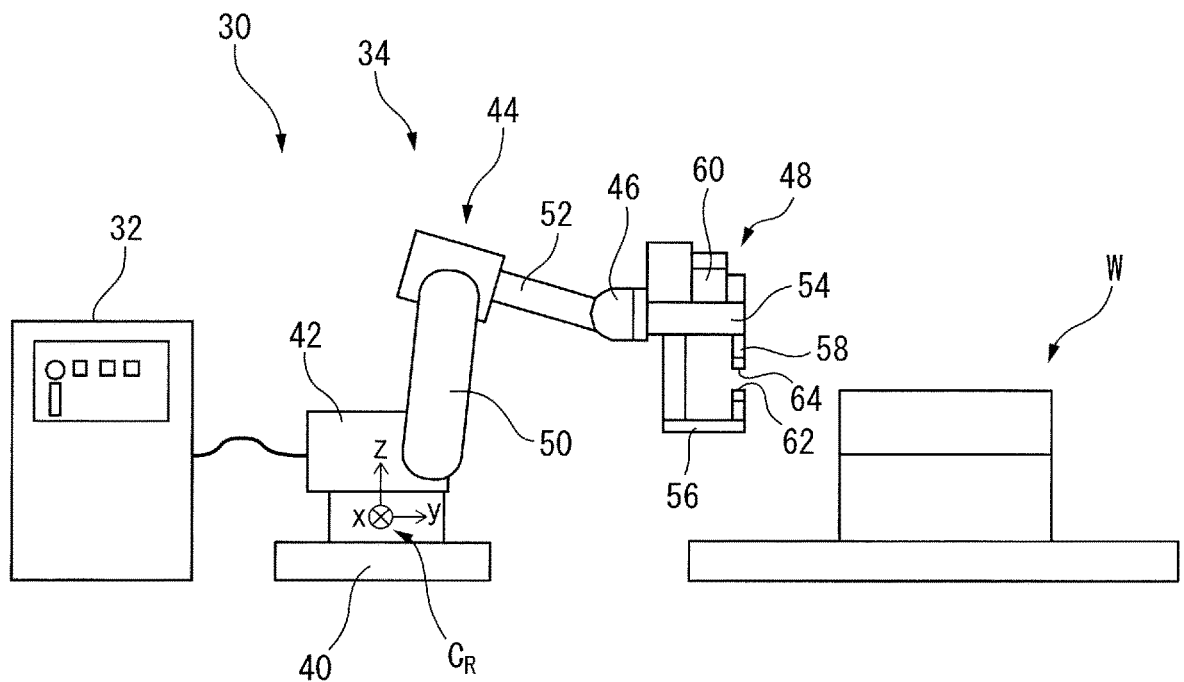
FIG. 2 is a schematic drawing of a robot system according to one embodiment.

Below, with reference to FIG. 2 and FIG. 3, a robot system and a basic motion pattern according to an embodiment are described. A robot system 30 illustrated in FIG. 2 is configured to carry out spot welding onto a workpiece W, and includes a robot controller 32 and a robot 34.

The robot controller 32 includes e.g. a CPU and a memory (not illustrated), and directly or indirectly controls each component of the robot 34. The robot 34 is e.g. a vertically articulated robot, and includes a base 40, a revolving body 42, a robot arm 44, a wrist 46, and an end effector 48. The base 40 is fixed on a floor of a work cell.

The revolving body 42 is provided at the base 40 so as to be rotatable about a vertical axis. The robot arm 44 includes a lower arm 50 rotatably coupled to the revolving body 42 and an upper arm 52 rotatably coupled to a distal end of the lower arm 50. The wrist 46 is rotatably coupled to a distal end of the upper arm 52 and supports the end effector 48.

Servomotors (not illustrated) are built in the revolving body 42, the robot arm 44, and the wrist 46, respectively. As one of the coordinate systems for automatic control, a robot coordinate system $C_R$ is set for the robot 34.

The robot controller 32 transmits a command to each servomotor with reference to the robot coordinate system $C_R$, and drives the revolving body 42, the robot arm 44, and the wrist 46. Thereby, the end effector 48 is arranged at an arbitrary position and orientation in the robot coordinate system $C_R$.

The end effector 48 is a spot welding gun, and includes a base 54, a fixed arm 56, a movable arm 58, a drive section 60, a fixed electrode tip 62, and a movable electrode tip 64.

The base 54 is coupled to the wrist 46 of the robot 34. The fixed arm 56 is fixed to the base 54 at its proximal end, while the fixed electrode tip 62 is fixed to a distal end of the fixed arm 56.

The movable arm 58 is movably provided at the base 54 so as to approach and separate away from the fixed electrode tip 62. The drive section 60 includes e.g. a servomotor, and moves the movable arm 58 so as to approach and separate away from the fixed electrode tip 62, in accordance with a command from the robot controller 32.

The fixed electrode tip 62 and the movable electrode tip 64 are energized in accordance with a command from the robot controller 32. Thereby, the fixed electrode tip 62 and the movable electrode tip 64 carry out spot welding onto the workpiece W held between the fixed electrode tip 62 and the movable electrode tip 64.

Figure 3:
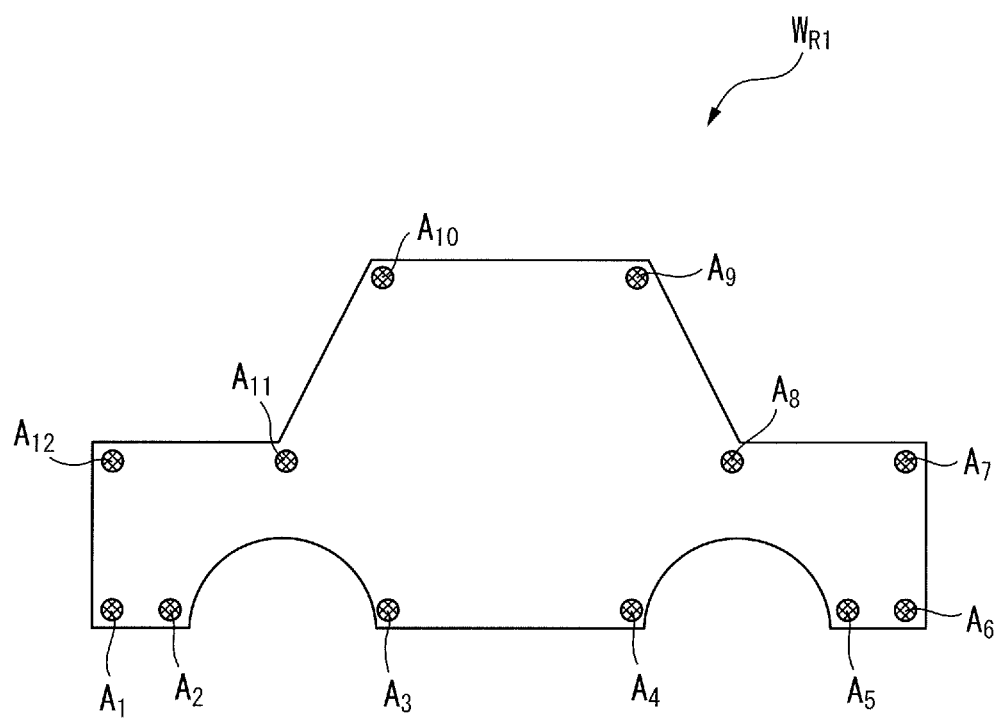
FIG. 3 is a schematic drawing of a reference workpiece according to one embodiment.

FIG. 3 illustrates a reference workpiece $W_{R1}$ according to an embodiment. The reference workpiece $W_{R1}$ is e.g. a car body, and has a predetermined reference workpiece shape. In the reference workpiece $W_{R1}$, a total of twelve reference working positions $A_1$ to $A_{12}$ are set. These reference working positions $A_1$ to $A_{12}$ are predetermined by a user. The robot 34 carries out spot welding onto each of the reference working positions $A_1$ to $A_{12}$.

The basic motion pattern 24 according to this embodiment causes the robot 34 to carry out spot welding onto each of the reference working positions $A_1$ to $A_{12}$. Specifically, the robot controller 32 controls the robot 34 in the robot coordinate system $C_R$ in accordance with the basic motion pattern 24, so as to carry out spot welding onto each of the reference working positions $A_1$ to $A_{12}$ by the end effector 48.

The basic motion pattern 24 causes the robot 34 to carry out spot welding onto each of the reference working positions $A_1$ to $A_{12}$ in a predetermined reference order. For example, the reference order is defined as an order: working positions
$A_1 \to A_2 \to A_3 \to A_4 \to A_5 \to A_6 \to A_7 \to A_8 \to A_9 \to A_{10} \to A_{11} \to A_{12}$.

The basic motion pattern 24 is constructed in advance by teaching a spot welding operation to the robot 34 with using e.g. a teaching pendant or simulation, and is stored in the storage 22.

The basic motion pattern 24 includes information on the reference workpiece shape of the reference workpiece $W_{R1}$, coordinates of each of the reference working positions $A_1$ to $A_{12}$ in the robot coordinate system $C_R$, the reference order, and the motion path of the robot 34 for moving the end effector 48 from the reference working position $A_n$ to the reference working position $A_{n+1}$ (n=1 to 11) in the reference order.

In the manufacturing line for processing the reference workpiece $W_{R1}$, there is a demand for carrying out a similar work onto a workpiece $W_1$ having a shape similar to the reference workpiece $W_{R1}$, i.e., the shape of the workpiece $W_1$ is slightly changed from the reference workpiece $W_{R1}$.

Figure 4A:
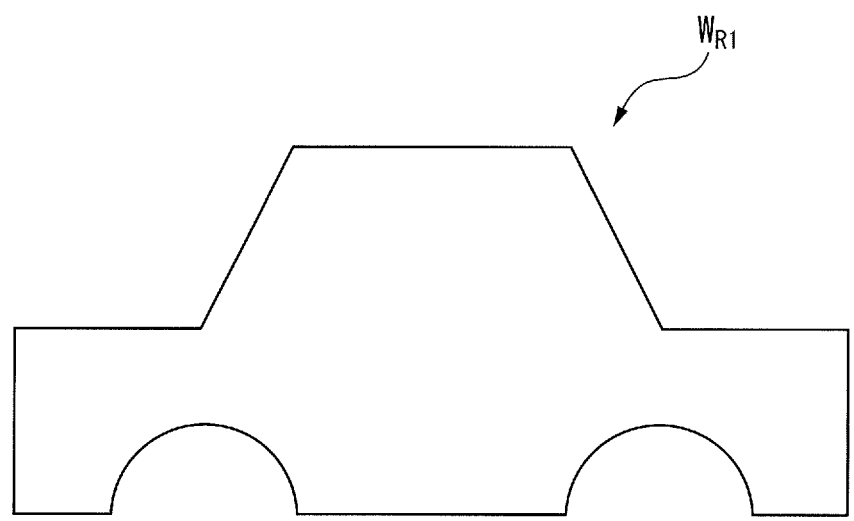
FIG. 4A illustrates the reference workpiece illustrated in FIG. 3
Figure 4B:
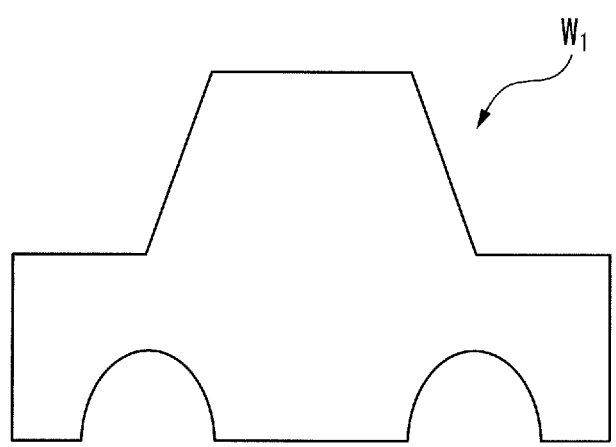
FIG. 4B illustrates an example of a workpiece similar to the reference workpiece.
Figure 4B:
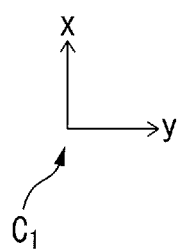

FIG. 4B illustrates an example of such a workpiece $W_1$. The workpiece $W_1$ has a shape which can be obtained by reducing a dimension in a length direction of the reference workpiece $W_{R1}$. The shapes of the reference workpiece $W_{R1}$ and the workpiece $W_1$ illustrated in FIG. 4A and FIG. 4B can be represented as coordinates or functions in a coordinate system $C_1$ illustrated in FIG. 4A and FIG. 4B.

As an example, the reference workpiece $W_{R1}$ and the workpiece $W_1$ may be produced so as to conform to different specifications (e.g., the specification of the reference workpiece $W_{R1}$ is for Japan, while that of the workpiece $W_1$ is for US), by which, the reference workpiece $W_{R1}$ and the workpiece $W_1$ may have slightly different shapes.

The device 10 according to this embodiment automatically generates the motion path for the robot 34 to carry out a work onto such workplace $W_1$, without teaching the robot 34.

Below, the function of the device 10 is described with reference to FIG. 1, and FIG. 3 to FIG. 6. The shape acquisition section 12 receives information on the shape of the workpiece $W_1$ to be processed by the robot 34. As an example, the shape acquisition section 12 receives the information on the shape of the workpiece $W_1$ from a shape input section, a vision sensor, or a mark read sensor that is described later.

The motion pattern acquisition section 14 acquires the basic motion pattern 24. In this embodiment, the motion pattern acquisition section 14 is communicably connected to the storage 22, and acquires the basic motion pattern 24 from the storage 22.

The similarity determination section 16 determines whether the shape of the workpiece $W_1$ is similar to the reference workpiece shape of the reference workpiece $W_{R1}$, based on the shape of the workpiece $W_1$ received by the shape acquisition section 12. As an example, the similarity determination section 16 is configured to automatically determine that the shape of the workpiece $W_1$ is similar to the reference workpiece shape of the reference workpiece $W_{R1}$ when the shape acquisition section 12 receives the shape of the workpiece $W_1$, as described later.

The position determination section 18 calculates working positions on the workpiece $W_1$ that respectively correspond to the reference working positions $A_1$ to $A_{12}$ in the reference workpiece shape, based on the shape of the workpiece $W_1$ and the reference workpiece shape of the reference workpiece $W_{R1}$ determined to be similar by the similarity determination section 16.

This calculation method is described with reference to FIG. 5A and FIG. 5B. FIG. 5A illustrates a rectangular reference workpiece shape B as an example, while FIG. 5B illustrates a deformed shape B' obtained by arbitrarily deforming the reference workpiece shape B. In the example illustrated in FIG. 5A, a point C is set at an arbitrary position in the reference workpiece shape B. The reference workpiece shape B, the deformed shape B', and the point C can be expressed as coordinates in the coordinate system $C_2$ in FIG. 5A and FIG. 5B.

A position of a point C' in the deformed shape B in FIG. 5B' corresponds to that of the point C in the reference workpiece shape B. If the coordinates (or functions) of the reference workpiece shape B and the deformed shape B' in the coordinate system $C_2$ are known, the position of the point C' (i.e., the coordinate in the coordinate system $C_2$) can be calculated as the coordinate in the coordinate system $C_2$ by substituting these coordinates (or functions) into a publicly known mapping theory equation.

One example of the mapping theory equation is represented in equation 1 below.

$$f = \arg\min_f \underbrace{\sum_k \|f(x^{(k)}) - x^{(k)\prime}\|^2 + \int_{x_1}\int_{x_2}\left[\left(\frac{\partial^2 f}{\partial x_1^2}\right)^2 + 2\left(\frac{\partial^2 f}{\partial x_1 \partial x_2}\right)^2 + \left(\frac{\partial^2 f}{\partial x_2^2}\right)^2\right]dx_1 dx_2}_{E}$$

Equation 1

In the above described equation 1, $f(x^{(k)})$ represents the coordinates of feature points (e.g., apexes and edges) of the deformed shape B', and $x^{(k)\prime}$ represents the coordinates of feature points of the reference workpiece shape B.

With using such a calculation method, the position determination section 18 calculates the working positions in the workpiece $W_1$ that correspond to the reference working positions $A_1$ to $A_{12}$ in the reference workpiece shape of the reference workpiece $W_{R1}$. Specifically, the position determination section 18 acquires, from pre-stored drawing data (e.g., 2DCAD data or 3DCAD data) of the reference workpiece $W_{R1}$, the coordinates (or functions) in the coordinate system $C_1$ in FIG. 4A of the reference workpiece shape of the reference workpiece $W_{R1}$.

Further, the position determination section 18 acquires the coordinates (or functions) of the shape of the workpiece $W_1$ in the coordinate system $C_1$ in FIG. 4B, based on the information on the shape of the workpiece $W_1$ received by the shape acquisition section 12. Then, the position determination section 18 calculates working positions $A_1'$ to $A_2'$ in the workpiece $W_1$ that respectively correspond to the reference working positions $A_1$ to $A_{12}$, by substituting the coordinates for functions) representing the shapes of the reference workpiece $W_{R1}$ and the workpiece $W_1$ into the mapping theory equation.

Figure 6:
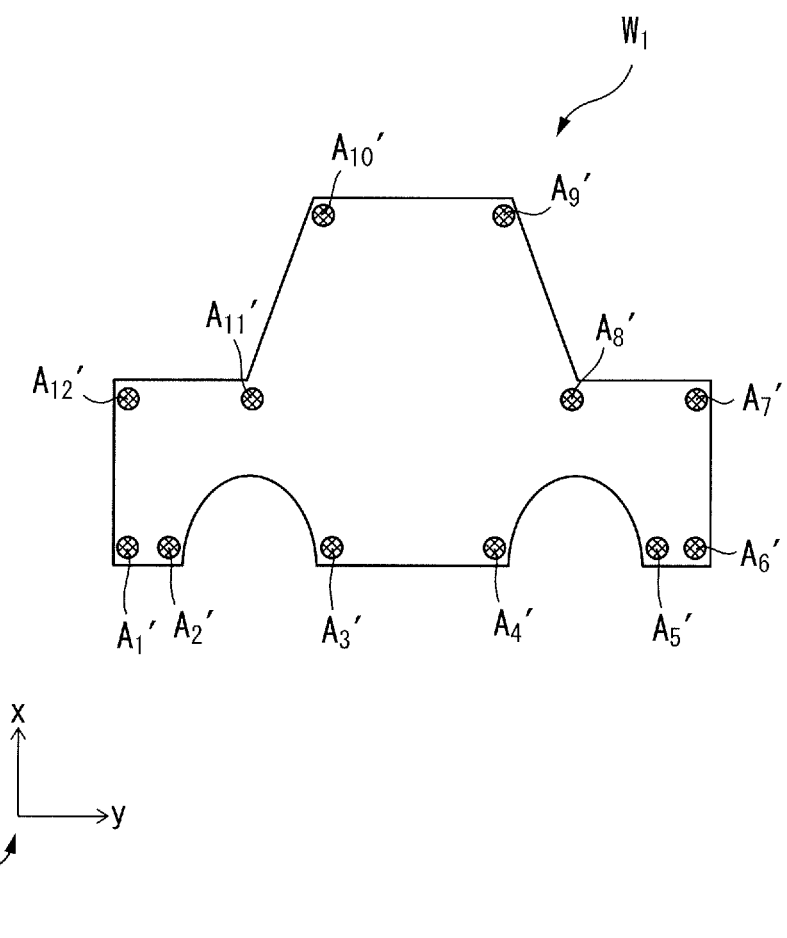
FIG. 6 is a drawing illustrating a working position calculated by the position determination section illustrated in FIG. 1 on the workpiece illustrated in FIG. 4B.

FIG. 6 illustrates the working positions $A_1'$ to $A_{12}'$ calculated in this manner. These working positions $A_1'$ to $A_{12}'$ are represented as the coordinates in the coordinate system $C_1$. Then, the position determination section 18 multiplies the calculated coordinates of the working position $A_1'$ to $A_{12}'$ in the coordinate system $C_1$ by a transformation matrix (e.g., Jacobian matrix) so as to transform them into a three-dimensional robot coordinate system $C_R$, thereby calculates coordinates of the working positions $A_1'$ to $A_{12}'$ in the robot coordinate system $C_R$.

In this way, the position determination section 18 can determine the working positions $A_1'$ to $A_{12}'$ in the workpiece $W_1$ that respectively correspond to the reference working positions $A_1$ to $A_{12}$ in the reference workpiece shape of the reference workpiece $W_{R1}$.

The motion-path generation section 20 changes the information on the reference working positions $A_1$ to $A_{12}$ (specifically, the coordinates in robot coordinate system $C_R$) included in the basic motion pattern 24 to the working positions $A_1'$ to $A_{12}'$ (specifically, the coordinates in robot coordinate system $C_R$) determined by the position determination section 18. In this way, the motion-path generation section 20 automatically generates the motion path for the robot 34 to carry out spot welding onto the working positions $A_1'$ to $A_{12}'$.

According to this embodiment, it is possible to automatically structure the motion path for the robot 34 when the robot 34 carries out a work (spot welding) onto the workpiece $W_1$ by making use of the basic motion pattern 24, without teaching the robot 34 again. Due to this, since the work for re-teaching the robot 34 can be reduced, the efficiency of the manufacturing line can be improved.

Figure 7:
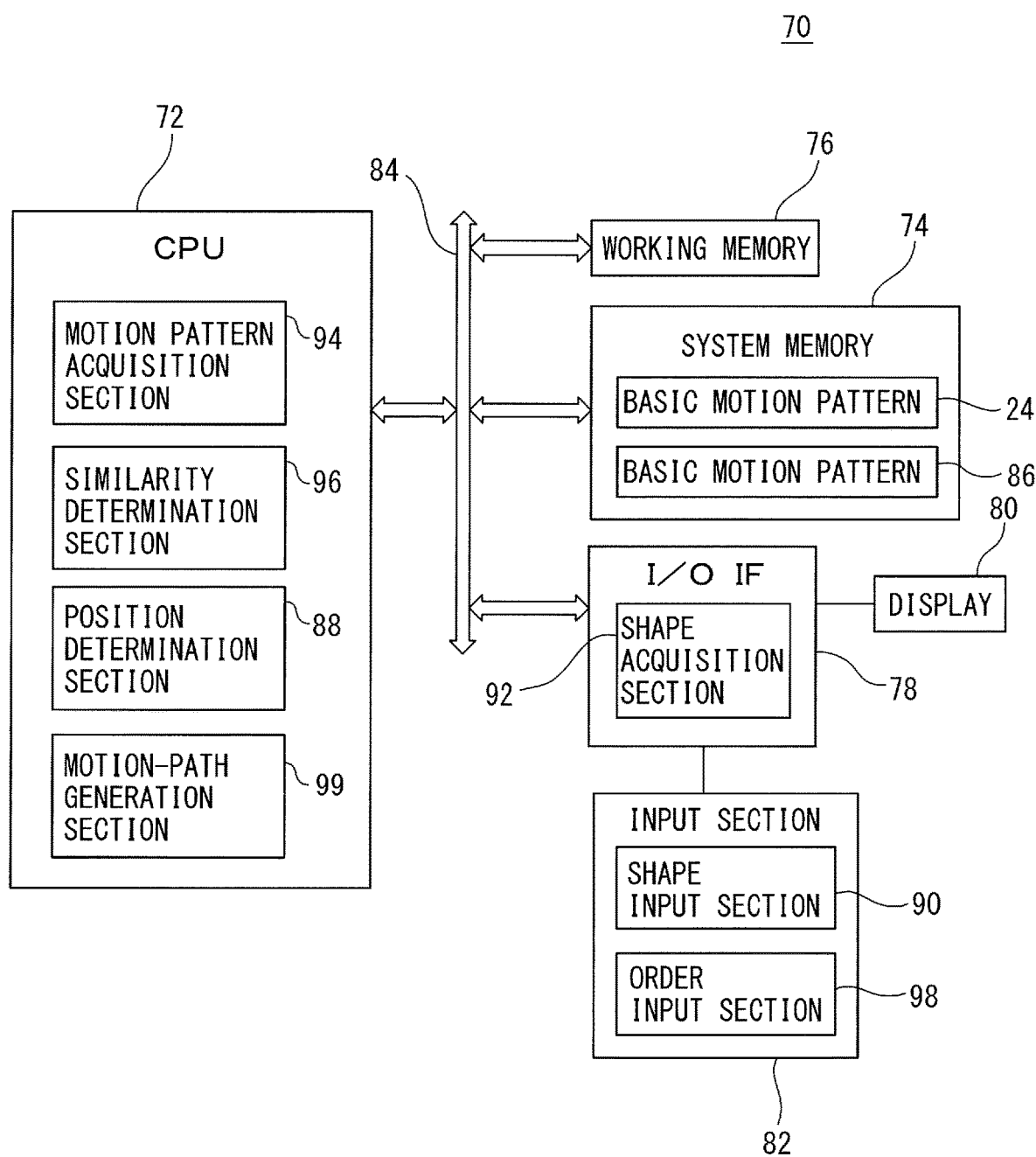
FIG. 7 is a block diagram of a device according to another embodiment.

Next, with reference to FIG. 7, a device 70 according to another embodiment is described. Similarly to the above-described device 10, the device 70 automatically generates the motion path for the robot 34 when the robot 34 carries out spot welding onto the workpiece $W_1$.

The device 70 includes a CPU 72, a system memory 74, a working memory 76, an input/output interface (I/O interface) 78, a display 80, and an input section 82. For example, the CPU 72, the system memory 74, the working memory 76, and the I/O interface 78 may be configured as a single computer (PC, tablet terminal, etc.).

The CPU 72 is communicably connected to the system memory 74, the working memory 76, and the I/O interface 78 via a bus 84, and carries out various processes described later while communicating with these components.

The system memory 74 is an electrically erasable/recordable non-volatile memory, and is configured from e.g. EEPROM®. The system memory 74 stores e.g. constants, variables, setting values, parameters, and programs necessary for the CPU 72 to carry out the various processes described later, so as not to be lost even when the device 70 is shut down.

In this embodiment, the system memory 74 stores in advance a plurality of types of basic motion patterns 24 and 86, types of drawing data of the reference workpieces $W_{R1}$ and $W_{R2}$ (e.g., 2DCAD data or 3DCAD data), and types of drawing data of the workpieces $W_1$ and $W_2$.

The working memory 76 temporarily stores data necessary for the CPU 72 to carry out the various processes. Further, the constants, variables, setting values, parameters, and programs stored in the system memory 74 are appropriately loaded onto the working memory 76. The CPU 72 uses the data loaded onto the working memory 76 in order to carry out the various processes.

The I/O interface 78 is communicably connected to the display 80 and the input section 82, and communicates with the input section 82 and the display 80 in response to a command from the CPU 72. The I/O interface 78 is configured from e.g. Ethernet port, the USB port or the like, and may communicate with the display 80 and the input section 82 by wire. Alternatively, the I/O interface 78 may wirelessly communicate with the display 80 and the input section 82 via a wireless LAN such as Wi-Fi.

The display 80 is configured from e.g. the CRT, the liquid crystal display (LCD), or the organic EL display. The display 80 receives the image data transmitted from the I/O interface 78, and displays it as an image visible for a user. The input section 82 includes e.g. a push button device, keyboard, touch panel, or mouse, and the user can input information thereto by operating the input section 82.

The system memory 74 stores a first type of basic motion pattern 24 and a second type of basic motion pattern 86. Similarly to the above described embodiment, the first type of basic motion pattern 24 causes the robot 34 to carry out spot welding onto the reference working position $A_1$ to $A_{12}$ in the first type of reference workpiece $W_{R1}$ illustrated in FIG. 3 in the predetermined reference order.

Figure 8A:
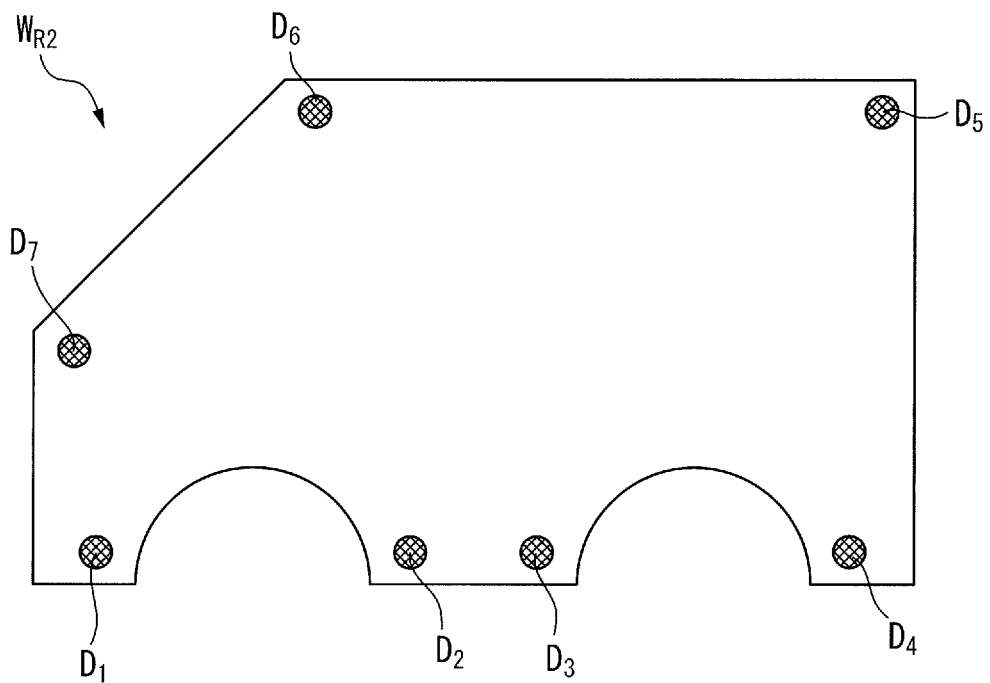
FIG. 8A illustrates a reference workpiece according to another embodiment and FIG. 8B illustrates an example of a workpiece similar to the reference workpiece.

On the other hand, the second type of basic motion pattern 86 is a computer program for causing the robot 34 to carry out spot welding onto the second type of reference workpiece $W_{R2}$ illustrated in FIG. 8A. The second type of reference workpiece $W_{R2}$ is e.g. a car body, and has a predetermined reference workpiece shape. For the second type of reference workpiece $W_{R2}$, a total of seven reference working positions $D_1$ to $D_7$ are set.

The second type of basic motion pattern 66 causes the robot 34 to carry out spot welding onto the respective reference working positions $D_1$ to $D_7$ in a predetermined reference order. The reference order may be set as the order of the working positions $D_1 \rightarrow D_2 = D_3 \rightarrow D_4 \rightarrow D_5 \rightarrow D_6 \rightarrow D_7$, for example.

The second type of basic motion pattern 86 is constructed in advance by teaching the work (i.e., spot welding) to the robot 34 with using e.g. a teaching pendant or a simulation, and stored in the system memory 74.

The second type of basic motion pattern 86 includes information on e.g. the reference workpiece shape of the reference workpiece $W_{R2}$, coordinates of the reference working position $D_1$ to $D_7$ in the robot coordinate system $C_R$, the reference order, and the motion path for the robot 34 to move the end effector 48 from the reference working position $D_n$ to the reference working position $D_{n+1}$ (n=1 to 7) in the reference order.

Figure 8B:
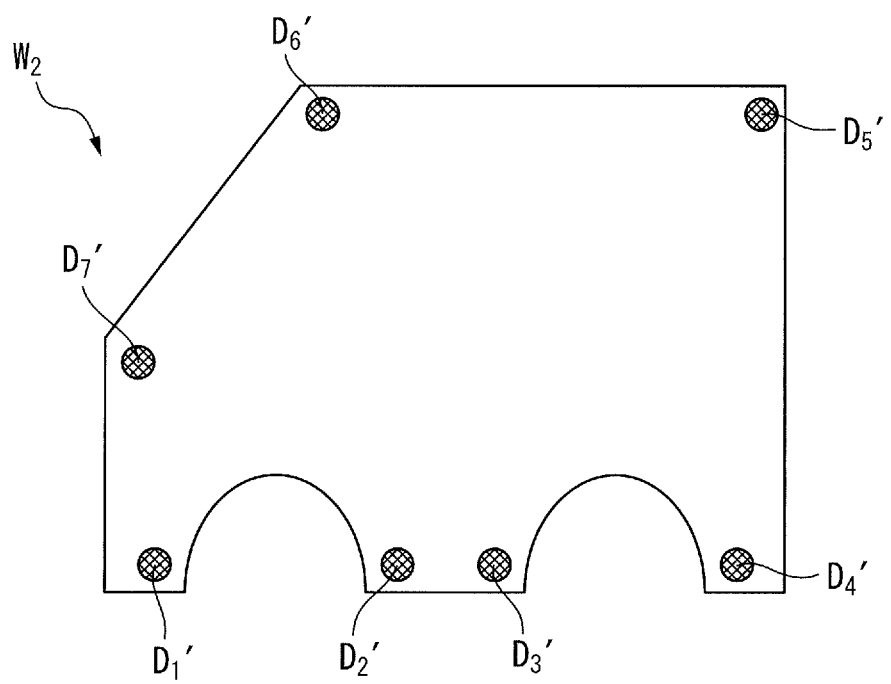

FIG. 8B illustrates an example of the workpiece having a shape similar to the reference workpiece shape of the second type of reference workpiece $W_{R2}$. The workpiece $W_2$ has a shape which can be obtained by reducing a dimension in the length direction of the second type of reference workpiece $W_{R2}$.

As an example, the second type of reference workpiece $W_{R2}$ and the workpiece $W_2$ may be produced so as to conform to different specifications (e.g., the specification of the reference workpiece $W_{R2}$ is for Japan, while that of the workpiece $W_2$ is for US), by which, the reference workpiece $W_{R2}$ and the workpiece $W_2$ may have slightly different shapes.

By using the calculation method described above with reference to FIG. 5A and FIG. 5B, the CPU 72 calculates the working positions $D_1'$ to $D_7'$ in the workpiece $W_2$ that respectively correspond to the reference working positions $D_1$ to $D_7$ in the second type of reference workpiece $W_{R2}$.

Further, similar to the above described embodiment, the CPU 72 calculates the working positions $A_1'$ to $A_{12}'$ that respectively correspond to the reference working positions $A_1$ to $A_{12}$ in the first type of reference workpiece $W_{R1}$. Thus, in this embodiment, the CPU 72 functions as a position determination section 88 (FIG. 7) configured to determine the working positions $A_1'$ to $A_{12}'$, and $D_1'$ to $D_7'$ that correspond to the reference working positions $A_1$ to $A_{12}$ and $D_1$ to $D_7$.

Figure 9:
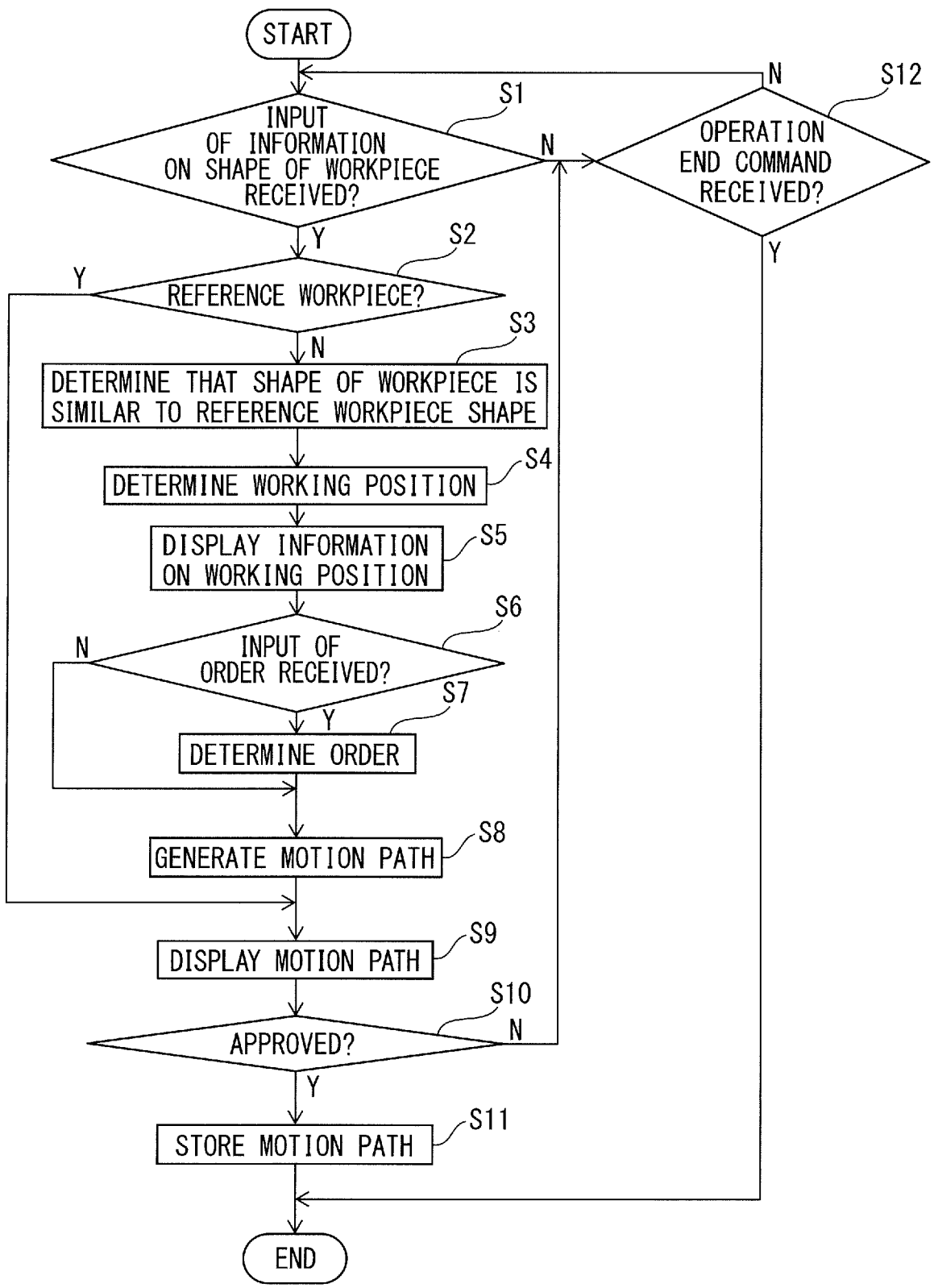
FIG. 9 is a flowchart representing one example of operational flows of the device illustrated in FIG. 7.

Next, with reference to FIG. 9, an example of an operation flow of the device 70 is described. The operation flow illustrated in FIG. 9 is started when the CPU 72 receives an operation-start command from the user. When the operation flow illustrated in FIG. 9 is started, the CPU 72 generates an image data of an input screen that enables the user to input information on the shape of the workpiece, and displays it on the display 80.

For example, the CPU 12 generates the input screen through which "Japanese specifications" of the first type of car body (corresponding to first type of reference workpiece $W_{R1}$), "US specification" of the first type of car body (corresponding to the workpiece $W_1$), "Japanese specification" of the second type of car body (corresponding to second type of reference workpiece $W_{R2}$), or "US specification" of the second type of car body (corresponding to workpiece $W_2$) can be selected. The user operates the input section 82 so as to select one of the above four options in the input screen displayed on the display 80.

The input section 82 transmits shape input data input by the user to the I/O interface 78. The shape input data includes information on the first type of reference workpiece $W_{R1}$, the second type of reference workpiece $W_{R2}$, the workpiece $W_1$ or the workpiece $W_2$ selected by the user, and corresponds to information on the shape of the workpiece $W_{R1}$, $W_{R2}$, $W_1$, or $W_2$.

Thus, in this embodiment, the input section 82 functions as a shape input section 90 (FIG. 7) configured to receive the input of the shape of the workpiece $W_{R2}$, $W_1$ or $W_2$.

The I/O interface 78 receives the shape input data from the input section. 82, and the CPU 72 stores the received shape input data in the working memory 76. Thus, in this embodiment, the I/O interface 78 functions as a shape acquisition section 92 (FIG. 7) configured to receive the information on the shape of the workpiece $W_{R1}$, $W_{R2}$, $W_1$ or $W_2$.

At step S1, the CPU 72 determines whether it receives the input of the information on the shape of the workpiece $W_{R1}$, $W_{R2}$, $W_1$, or $W_2$. Specifically, the CPU 72 determines whether the I/O interface 78 receives the shape input data.

When the CPU 72 determines that it receives the shape input data (i.e., determines YES), the process advances to step S2. On the other hand, when the CPU 72 determines that it does not receive the shape input data (i.e. determines NO), the process advances to step S12.

At step S2, the CPU 72 determines whether the shape input data received by the I/O interface 78 is data representing the selection of the reference workpiece $W_{R1}$ or $W_{R2}$ (i.e., "Japanese specifications"). The basic motion patterns 24 and 86 are stored in the system memory 74 in association with the reference workpieces $W_{R1}$ and $W_{R2}$, respectively.

The CPU 72 reads out the basic motion patterns 24 and 86 from the system memory 74 to acquire the basic motion patterns 24 and 86. Thus, the CPU 72 functions as a motion pattern acquisition section 94 (FIG. 7) configured to acquire the basic motion patterns 24 and 86.

The CPU 72 compares the shape input data received by the I/O interface 78 with the acquired basic motion patterns 24 and 86, thereby can determine whether the shape input data is data representing the selection of the reference workpiece $W_{R1}$ or $W_{R2}$.

When the CPU 72 determines that the shape input data received by the I/O interface 78 is the data representing the selection of the reference workpiece $W_{R1}$ or $W_{R2}$ (i.e., determines YES), the process advances to step S9.

On the other hand, when the CPU 72 determines that the shape input data received by the I/O interface 78 is the data representing the selection of the workpiece $W_1$ or $W_2$ (i.e., "US specification") (i.e., determines NO), the process advances to step S3.

At step S3, the CPU 72 determines that the shape of the workpiece $W_1$ or $W_2$ is similar to the reference workpiece shape of the reference workpiece $W_{R1}$ or $W_{R2}$. Specifically, in order to determine that the shape of the workpiece $W_1$ is similar to the reference workpiece shape of the first type of reference workpiece $W_{R1}$, the information on the workpiece $W_1$ (drawing data) is stored in the system memory in association with the information on the first type of reference workpiece $W_{R1}$.

Similarly, in order to determine that the shape of the workpiece $W_2$ is similar to the reference workpiece shape of the second type of reference workpiece $W_{R2}$, the information on the workpiece $W_2$ is stored in the system memory in association with the information on the second type of reference workpiece $W_{R2}$.

Assume that the CPU 72 receives the shape input data of the workpiece $W_1$ through the I/O interface 78, and determines NO at step S2. In this case, at this step S3, the CPU 72 automatically determines that the workpiece $W_1$, the input of which has been received, is similar to the first type of reference workpiece $W_{R1}$ associated with the information on the workpiece $W_1$, and reads out from the system memory 74 the drawing data of the workpiece $W_1$ and the first type of reference workpiece $W_{R1}$.

On the other hand, assume that the CPU 72 receives the shape input data of the workpiece $W_2$ through the I/O interface 78, and determines NO at step S2. In this case, at this step S3, the CPU 72 automatically determines that the workpiece $W_2$, the input of which has been received, is similar to the second type of reference workpiece $W_{R2}$, and reads out from the system memory 74 the drawing data of the workpiece $W_2$ and the second type of reference workpiece $W_{R2}$.

Thus, in this embodiment, the CPU 72 functions as a similarity determination section 96 (FIG. 7) configured to determine whether the shape of the workpiece $W_1$, $W_2$ acquired by the shape acquisition section. 92 is similar to the reference workpiece shape of the reference workpiece $W_{R1}$, $W_{R2}$ included in the basic motion pattern 24, 86 acquired by the motion pattern acquisition section 94.

In this respect, the CPU 72 determines than the workpiece $W_1$ or $W_2$, the input of which has been received, is similar to the reference workpiece $W_{R1}$ or $W_{R2}$ in accordance with a predetermined rule. The predetermined rule in this embodiment is a rule in which the workpiece $W_1$ or $W_2$, the input of which has been received, is determined to be similar to the reference workpiece $W_{R1}$ or $W_{R2}$ associated with the received workpiece $W_1$ or $W_2$.

At step S4, the CPU 72 determines the working positions $A_1'$ to $A_{12}'$, or $D_1'$ to $D_7'$ on the workpiece $W_1$ or $W_2$. Specifically, the CPU 72 functions as the position determination section 88 so as to determine the working positions $A_1'$ to $A_{12}'$ illustrated in FIG. 6, or the working positions $D_1'$ to $D_7'$ illustrated in FIG. 8B, with using drawing data of the workpiece $W_1$ or $W_2$ and the reference workpiece $W_{R2}$ or $W_{R2}$ read out at step S3, and using the above described calculation method.

At step S5, the CPU 72 displays the information on the working positions $A_1'$ to $A_{12}'$ or $D_1'$ to $D_7'$ determined at step S4. Specifically, the CPU 72 generates image data of the working positions $A_1'$ to $A_{12}'$ or $D_1'$ to $D_7'$ determined at step S4 as illustrated in FIG. 6 or FIG. 8B, and display it on the display 80.

In the image displayed on the display 80 at this time, information on the reference order (e.g., the order of $D_1 \rightarrow D_2 \rightarrow D_3 \rightarrow D_4 \rightarrow D_5 \rightarrow D_6 \rightarrow D_7$) and an order input screen enabling the user to change the reference order are also shown. The user operates the input section 82 so as to input the change of the reference order in the order input screen displayed on the display 80.

For example, when the display 80 displays the workpiece $W_2$ illustrated in FIG. 8B and the order input screen, the user operates the input section 82 so as to change the order to carry out spot welding on the workpiece from the reference order: $D_1 \rightarrow D_2 \rightarrow D_3 \rightarrow D_4 \rightarrow D_6 \rightarrow D_6 \rightarrow D_7$ to an arbitrary order (e.g., $D_7 \rightarrow D_1 \rightarrow D_6 \rightarrow D_2 \rightarrow D_3 \rightarrow D_5 \rightarrow D_4$).

Thus, in this embodiment, the input section 82 functions as an order input section 98 (FIG. 7) configured to receive the input of the order in which the robot 34 carries out the work (spot welding). The input section 82 transmits the order input data input by the user to the I/O interface 78. The I/O interface 78 receives the order input data from the input section 82, and then the CPU 72 stores the received order input data in the working memory 76.

At step S6, the CPU 72 determines whether it receives the input of the order for carrying out the work. Specifically, the CPU 72 determines whether the I/O interface 78 receives the order input data from the input section 82.

When the CPU 72 determines that the I/O interface 78 receives the order input data (i.e., determines YES), the process advances to step S7. On the other hand, when the CPU 72 determines that the I/O interface 78 does not receive the order input data (i.e., determines NO), the process advances to step S8.

At step S7, the CPU 72 sets an order in which the robot 34 carries out the work (spot welding) onto the working positions ($A_1'$ to $A_{12}'$ or $D_1'$ to $D_7'$) to the order received from the user, and stores the setting of the order in the working memory 76.

At step S8, the CPU 72 generates the motion path. Specifically, the CPU 72 changes the information on the reference working positions $A_1$ to $A_{12}$ or $D_1$ to $D_7$ included in the basic motion pattern 24 or 86 to the working positions $A_1'$ to $A_{12}'$ or $D_1'$ to $D_7'$ determined at step S4.

If step S8 is carried out after step S7, the CPU 72 changes the reference order (e.g., $D_1 \to D_2 \to D_3 \to D_4 \to D_5 \to D_6 \to D_7$) included in the basic motion pattern 24 or 86 to the order (e.g., $D_7 \to D_1 \to D_6 \to D_2 \to D_3 \to D_5 \to D_4$) determined at step S7.

On the other hand, if step S8 is carried out after determining NO at step S6, the CPU 72 maintains the setting of the reference order included in the basic motion pattern 24 or 86.

In this way, the CPU 72 automatically generates the motion path for the robot 34 to carry out the work (spot welding) onto the working positions $A_1'$ to $A_{12}'$ or $D_1'$ to $D_7'$ in the order designated by the user or in the reference order.

For example, when the user selects the "US specification" (workpiece $W_2$) of the second type of car body and sets the order of the work to $D_7' \to D_1' \to D_6' \to D_2' \to D_3' \to D_5' \to D_4'$, at this step S8, the CPU 72 generates the motion path for the robot 34 to carry out spot welding onto the working position $D_1'$ to $D_7'$ on the workpiece $W_1$ in the order of $D_7' \to D_1' \to D_6' D_2' \to D_3' \to D_5' \to D_4'$.

Thus, in this embodiment, the CPU 72 functions as a motion-path generation section 99 (FIG. 7) configured to generate the motion path for the robot 34 to carry out the work onto the working positions $A_1'$ to $A_{12}'$ or $D_1'$ to $D_7'$.

At step S9, the CPU 72 displays the motion path. If step S9 is carried out after step S8, the CPU 72 generates image data representing the motion path generated at step S8, and displays it on the display 80.

On the other hand, if step S8 is carried out after determining YES at step S2, the CPU 72 reads out from the system memory 74 the basic motion pattern 24 or 86 that corresponds to the type of the reference workpiece $W_{R1}$ or $W_{R2}$ received from the user at step S1. Then, the CPU 72 generates image data representing the read-out basic motion pattern 24 or 86, and displays it on the display 80.

In the image displayed on the display 80 at this time, an approval button is represented together with a non-approval button. The user can select whether to approve or not to approve the motion path displayed on the display 80 by clicking the approval button or the non-approval button in the image.

At step S10, the CPU 72 determines whether the user approves the motion path. Specifically, the CPU 72 determines whether it receives the click input to the approval button displayed on the display 80 at step S9.

When the CPU 72 determines that it receives the click input to the approval button (i.e., determines YES), the process advances to step S11. On the other hand, when the CPU 72 determines that it receives the click input to the non-approval button (i.e., determines NO), the CPU 72 causes the display 80 to display the input screen enabling the user to input the information on the shape of the workpiece, similar to the start of the flow of FIG. 9, and proceeds to step S12.

At step S11, the CPU 72 stores in the system memory 74 the motion path displayed at step S9 as a practical motion path used for carrying out the work onto the workpiece by the robot 34 in an actual manufacturing line. Then, the CPU 72 ends the flow illustrated in FIG. 9.

On the other hand, when it is determined NO at step S1 or 10, at step S12, the CPU 72 determines whether it receives an operation end command from the user. When the CPU 72 determines that it receives the operation end command (i.e., determines YES), the CPU 72 ends the flow illustrated in FIG. 9. On the other hand, when the CPU 72 determines that it has not received the operation end command (i.e., determines NO), the process returns to step S1.

Thus, according to this embodiment, it is possible to structure the motion path for the robot 34 when the robot 34 carries out spot welding onto the workpiece $W_1$ or $W_2$ by making use of the basic motion pattern 24 or 86, without teaching the robot 34 again. Due to this, since the work for re-teaching the robot 34 can be reduced, the efficiency of the manufacturing line can be improved.

Further, in this embodiment, the device 70 includes the shape input section 90. Due to this, the user Can easily input the information on the shape of the workpiece to be processed through the shape input section 90.

Further, in this embodiment, the device 70 includes the order input section 98, and the CPU 72 generates the motion path for the robot to carry out the work in the order designated by the user. According to this configuration, the user can automatically structure the motion path for the robot 34 to carry out the work in a desired order, without teaching the robot 34 again. Accordingly, the efficiency of the manufacturing line can be improved advantageously.

Note that, in this embodiment, the system memory 74 stores the information on two types of reference workpieces $W_{R1}$ and $W_{R2}$ and two types of basic motion patterns 24 and 86 that correspond to reference workpieces $W_{R1}$ and $W_{R2}$.

However, the system memory 74 may pre-store the information on n types of (n is the integer of three or more) reference workpieces $W_{R1}$ to $W_{Rn}$ and n types of basic motion patterns that respectively correspond to the reference workpieces $W_{R1}$ to $W_{Rn}$.

Further, information on a group of workpieces may be stored in the system memory 74 in association with each of the reference workpieces $W_{R1}$ to $W_{Rn}$ as being similar to each of the reference workpieces $W_{R1}$ to $W_{Rn}$.

For example, a group of workpieces including a total of m (m is the integer of two or more) workpieces, i.e., workpieces $W_1$, $W_{1-2}$, $W_{1-3}$, ... and $W_{1-m}$, may be stored in association with the reference workpiece $W_{R1}$ as being similar to the reference workpiece $W_{R1}$.

In this case, when the flow illustrated in FIG. 9 is started, the CPU 12 generates image data of an input screen that enables the user to select a desired workpiece from the reference workpieces $W_{R1}$ to $W_{Rn}$ and the groups of workpieces associated with the respective reference workpieces $W_{R1}$ to $W_{Rn}$, and displays it on the display 80. Then, the CPU 12 is triggered by the shape input data from the user to carry out the flow of steps S1 to S12 described above.

Figure 10:
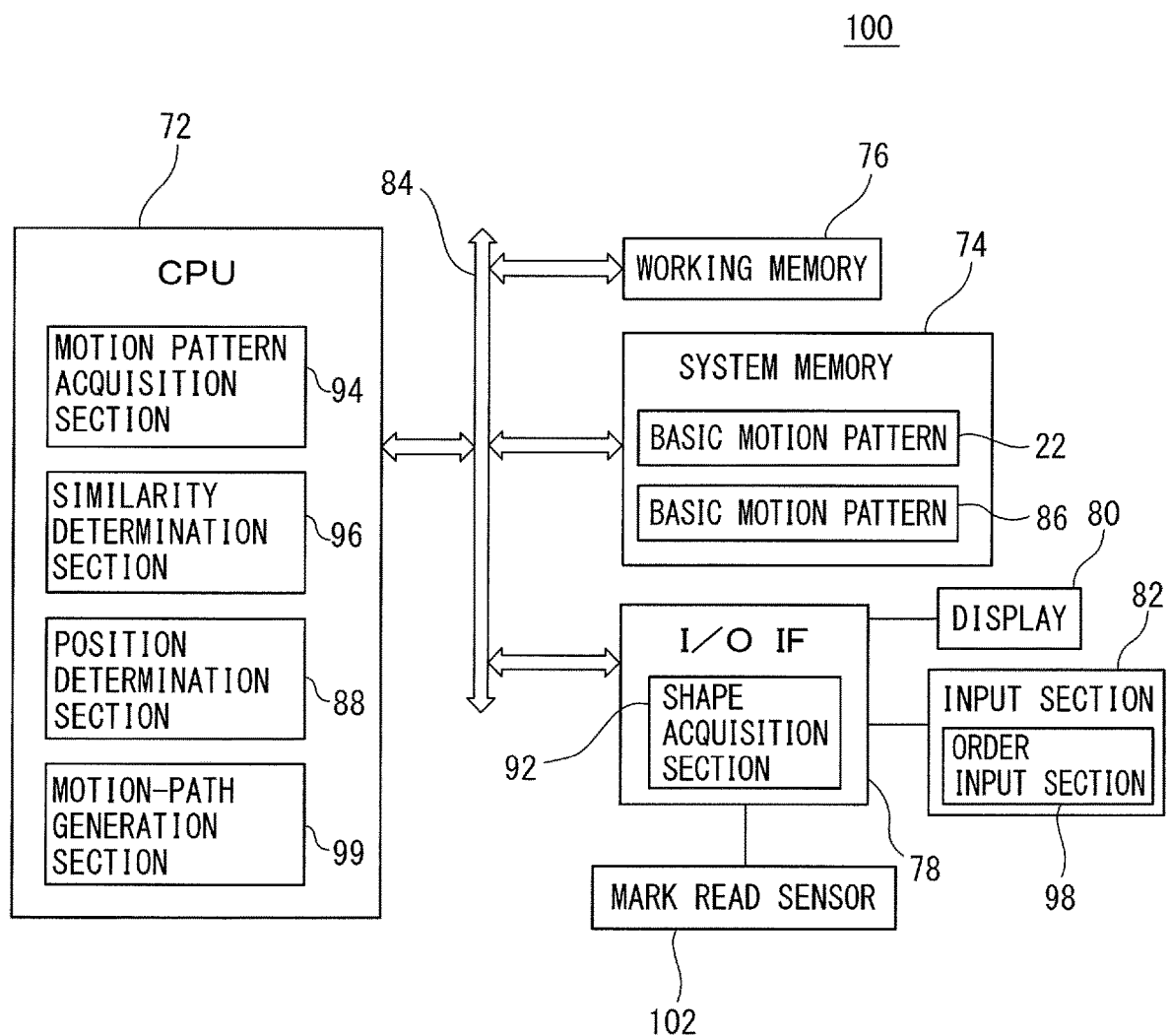
FIG. 10 is a block diagram of a device according to still another embodiment.

Next, with reference to FIG. 10, a device 100 according to still another embodiment is described. The device 100 differs from the above described device 70 in the following configuration. Specifically, the device 100 includes a mark read sensor 102, instead of the shape input section 90.

The mark read sensor 102 is communicably connected with the I/O interface 78. The mark read sensor 102 is e.g. a barcode reader or a QR code reader, and may read a predetermined mark (e.g., barcode or QR code).

In this embodiment, the mark is provided on a surface of a workpiece conveyed on the manufacturing line. In this case, the mark may be engraved directly on the surface of the workpiece, or may be provided as a member (e.g., seal) independent from the workpiece and attached to the surface of the workpiece.

As an example, the mark read sensor 102 may be a hand-held device that is portable by a user. In this case, the user manually reads the mark oil the workpiece conveyed on the manufacturing line by the hand-held mark read sensor 102.

As another example, the mark read sensor 102 may be fixed to a predetermined position on the manufacturing line.

In this case, the mark read sensor 102 automatically reads the mark on the workpiece conveyed on the manufacturing line.

In this embodiment, information on the shape of the workpiece to be processed is indicated in the mark, and the mark read sensor 102 reads the mark and transmit to the I/O interface 78 the information on the shape of the workpiece included in the mark.

Next, with reference to FIG. 9, one example of an operation flow of the device 100 is described. Similarly to the above described device 70, the CPU 72 of the device 100 carries out the flow illustrated in FIG. 9. In this embodiment, on each of the workpieces $W_{R1}$, $W_{R2}$, $W_1$, and $W_2$, a mark indicative of its information is provided.

The mark read sensor 102 reads the mark on the workpiece $W_{R1}$, $W_{R2}$, $W_1$, or $W_2$ conveyed on the manufacturing line, and acquires mark information indicated in the mark. The mark information includes information for identifying the type of the shape of the workpiece $W_{R1}$, $W_{R2}$, $W_1$, $W_2$, which corresponds to the information on the shape of the workpiece $W_{R1}$, $W_{R2}$, $W_1$, $W_2$.

The mark read sensor 102 transmits the acquired mark information to the I/O interface 78. The I/O interface 78 functions as the shape acquisition section 92 and receives from the mark read sensor 102 the mark information. The CPU 72 stores the received mark information in the working memory 76.

At step S1, the CPU 72 determines whether it receives the input of the information on the shape of the workpiece $W_{R1}$, $W_{R2}$, $W_1$, or $W_2$. Specifically, the CPU 72 determines whether the I/O interface 78 receives the mark information from the mark read sensor 102.

When the CPU 72 determines that it receives the mark information (i.e., determines YES), the process advances to step S2. On the other hand, when the CPU 72 determines that it does not receive the mark information. (i.e., determines NO), the process advances to step S12.

At step S2, the CPU 72 determines whether the mark information received by the I/O interface 78 identifies the reference workpiece $W_{R1}$ or $W_{R2}$. When the CPU 72 determines that the received mat information identifies the reference $W_{R1}$ or $W_{R2}$ (i.e., determines YES), the process advances to step S9.

On the other hand, when the CPU 72 determines that the mark information received by the I/O interface 78 identifies the workpiece $W_1$ or $W_2$ (i.e., determines NO), the process advances to step S3. After step S2, the CPU 72 sequentially carries out steps S3 to S12, similarly to the above described device 70.

In this embodiment, the device 100 includes the mark read sensor 102. Due to this, it is possible to easily identify the shape of the workpiece $W_{R1}$, $W_{R2}$, $W_1$, $W_2$ conveyed on the manufacturing line.

Figure 11:
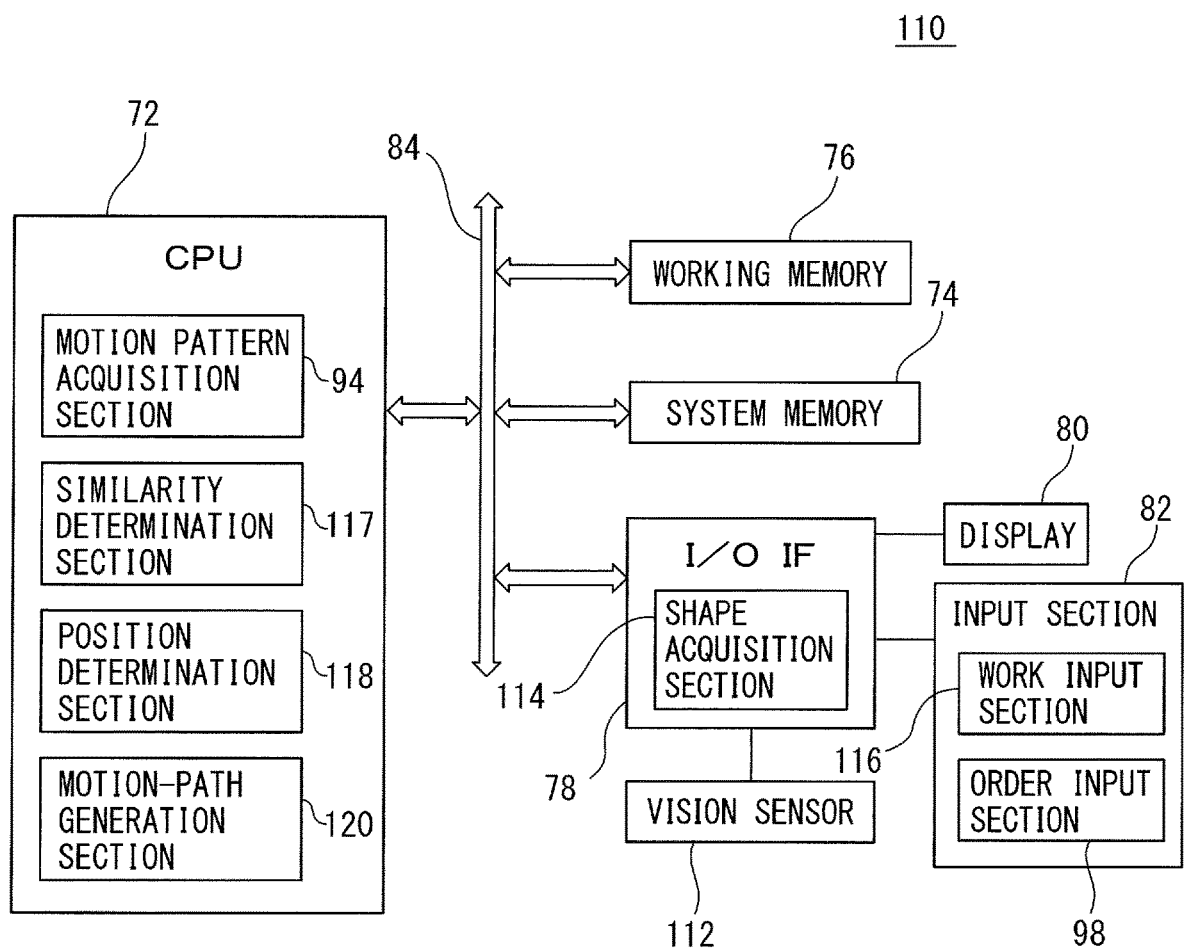
FIG. 11 is a block diagram of a device according to still another embodiment.

Next, with reference to FIG. 11, a device 110 according to still another embodiment is described. The device 110 differs from the above described device 100 in the following configuration. Specifically, the device 110 includes a vision sensor 112 and a work input section 116.

The vision sensor 112 is e.g. a three-dimensional vision sensor, and includes an optical system, such as a focus lens, and an imaging sensor, such as a CCD sensor or a CMOS sensor. The vision sensor 112 is fixed at a position capable of imaging a workpiece conveyed on the manufacturing line, and is communicably connected to the I/O interface 78. In accordance with a command from the controller 72, the vision sensor 112 images the workpiece on the manufacturing line, and transmits the captured image to the I/O interface 78.

Figure 12:
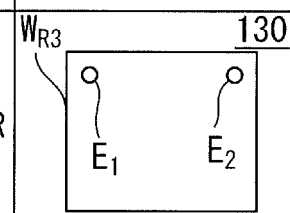
FIG. 12 illustrates a table for explaining types of basic motion patterns.
Figure 12:
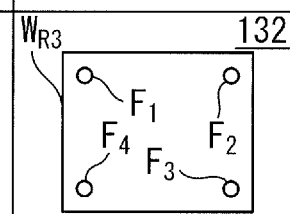
Figure 12:
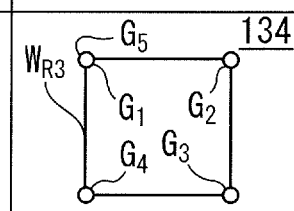
Figure 12:
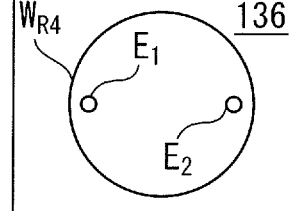
Figure 12:
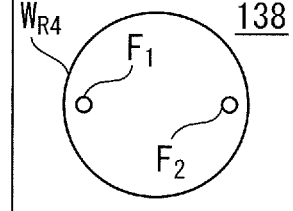
Figure 12:
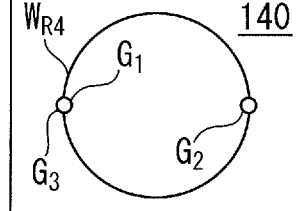
Figure 12:
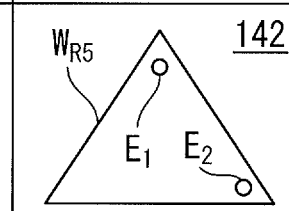
Figure 12:
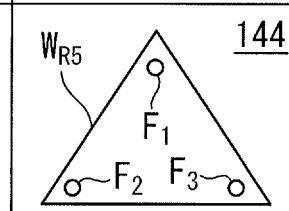
Figure 12:
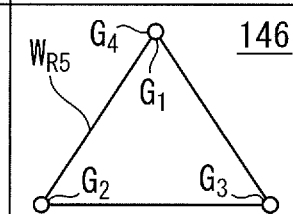
Figure 12:
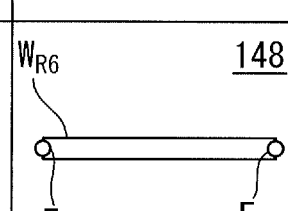
Figure 12:
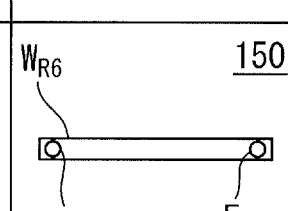
Figure 12:
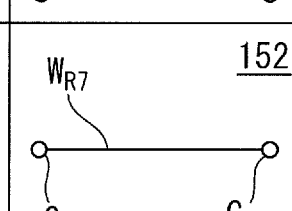

FIG. 12 illustrates a table for explaining a total of twelve types of basic motion patterns 130, 132, 134, 136, 138, 140, 142, 144, 146, 148, 150, and 152 pre-stored in the system memory 74 in this embodiment.

The basic motion patterns 130, 136, 142 and 148 shown in a column "Grip" of "Work" in FIG. 12 are computer programs for causing a robot to grip reference working positions $E_n$ (n=1, 2) set on each of a reference workpiece $W_{R3}$ having a rectangular reference workpiece shape, a reference workpiece $W_{R4}$ having a circular reference workpiece shape, a reference workpiece $W_{R5}$ having a triangular reference workpiece shape, and a reference workpiece $W_{R6}$ having a linear reference workpiece shape.

For example, the basic motion pattern 136 in FIG. 12 causes the robot to grip the two reference working positions $E_1$ and $E_2$ set on the circular reference workpiece $W_{R4}$. When carrying out the work for gripping the reference working position $E_n$, a robot hand (not illustrated) able to grip an object is mounted as an end effector of the robot 34 illustrated in FIG. 2, instead of the above end effector 48.

The basic motion patterns 132, 138, 144, and 150 shown in a column "Spot welding" of "Work" in FIG. 12 are computer programs for causing the robot 34 to carry out spot welding onto reference working positions $F_n$ (n=1 to 4) set on each of four types of reference workpieces $W_{R3}$, $W_{R4}$, $W_{R5}$ and $W_{R6}$, in a reference order of $F_n \rightarrow F_{n+1}$.

For example, the basic motion pattern 132 in FIG. 12 causes the robot 34 to carry out spot welding onto the four reference working positions $F_1$ to $F_4$ set on the rectangular reference workpiece $W_{R3}$ in the reference order of $F_1 \rightarrow F_2 \rightarrow F_3 \rightarrow F_4$.

The basic motion patterns 134, 140, 146, and 152 shown in a column "Arc welding" of "Work" in FIG. 12 are computer programs for causing the robot 34 to carry out arc welding onto the reference working positions $G_n$ (n=1 to 5) set on each of four types of reference workpieces $W_{R3}$, $W_{R4}$, $W_{R5}$ and $W_{R6}$, in a reference order of $G_n \rightarrow G_{n+1}$.

For example, the basic motion pattern 146 in FIG. 12 causes the robot to carry out arc welding onto the four reference working positions $G_1$ to $G_4$ set on the triangular reference workpiece $W_{R5}$ in a reference order of $G_1 \rightarrow G_2 \rightarrow G_3 \rightarrow G_4$. When carrying out arc welding, an end effector for arc welding (not illustrated) is mounted to the robot 34 illustrated in FIG. 2, instead of the end effector 48.

In this way, twelve types of the basic motion patterns 130 to 152 cause the robot to carry out three types of works (i.e., gripping, spot welding, and arc welding) onto each of the four types of the reference workpieces $W_{R3}$, $W_{R4}$, $W_{R5}$ and $W_{R6}$.

Each of twelve types of the basic motion patterns 130 to 152 includes the information on the reference workpiece shape of the reference workpiece $W_{R3}$, $W_{R4}$, $W_{R5}$, $W_{R6}$, the reference working positions $F_n$, $G_n$, $E_n$, and the type of work (gripping, spot welding, arc welding) onto the reference working positions.

The system memory 74 pre-stores the twelve types of the basic motion patterns 130 to 152 and drawing data of the four types of the reference workpieces $W_{R3}$, $W_{R4}$, $W_{R5}$ and $W_{R6}$. The CPU 72 functions as the motion pattern acquisition section 94, and reads out and acquires the basic motion patterns 130 to 152 from the system memory 74.

Figure 13:
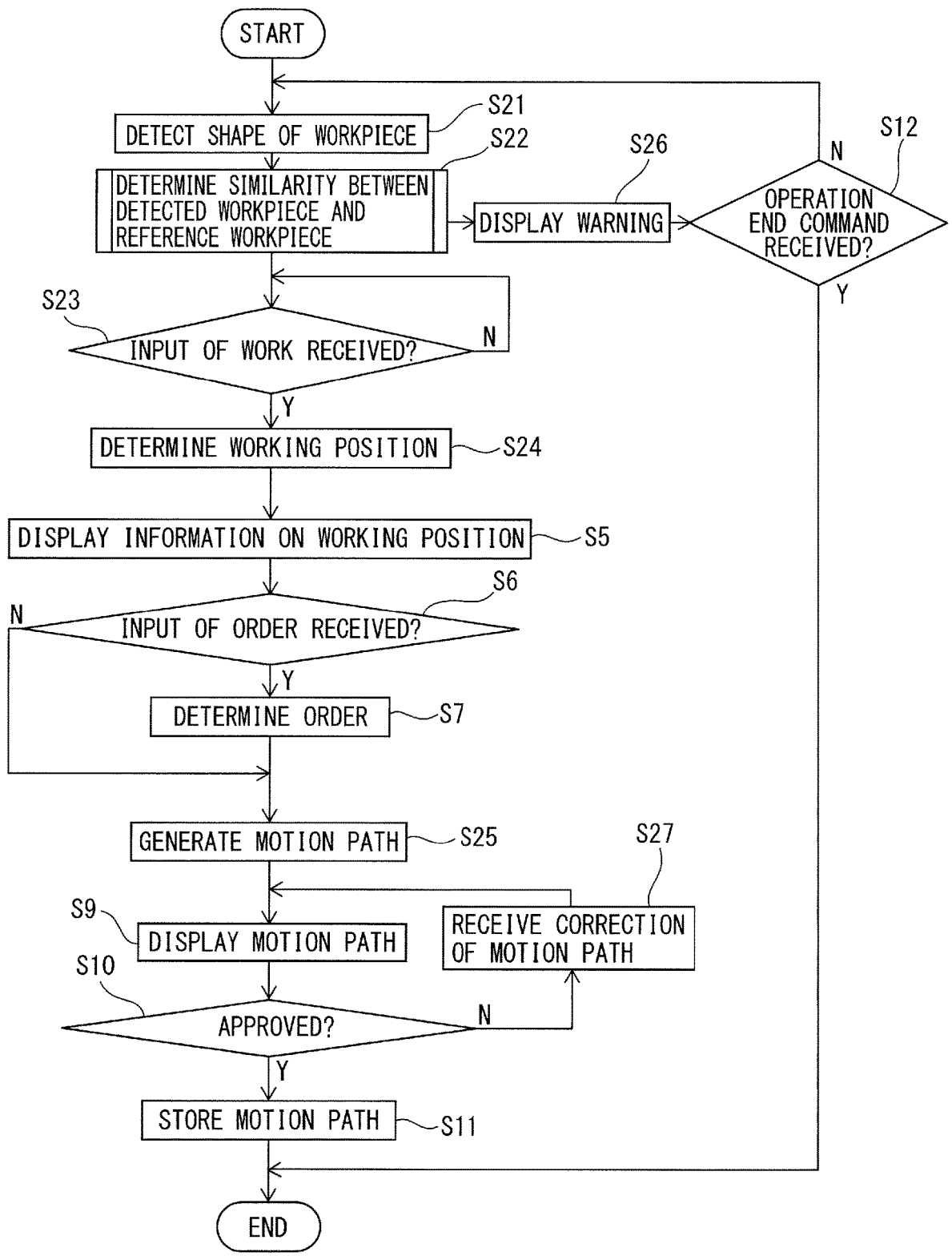
FIG. 13 is a flowchart representing one example of operational flows of the device illustrated in FIG. 11.

Next, with reference to FIG. 13, one example of an operation flow of the device 110 is described. Note that, in the flow illustrated in FIG. 13, processes similar to the flow illustrated in FIG. 9 are assigned the same step numbers, and detailed descriptions thereof will be omitted.

At step S21, the vision sensor 112 detects a shape of a workpiece. Specifically, the controller 72 transmits a command to the vision sensor 112 so as to image the workpiece on the manufacturing line by the vision sensor 112.

Figure 15:
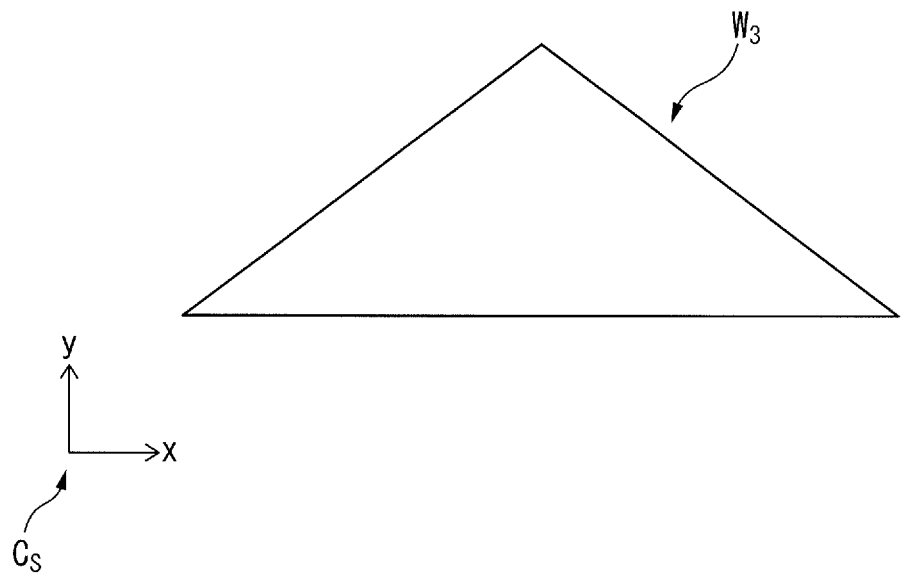
FIG. 15 illustrates an example or an image of a workpiece captured by a vision sensor illustrated in FIG. 11.

FIG. 15 illustrates an example of an image of a workpiece $W_3$ captured by the vision sensor 112. As illustrated in FIG. 15, the shape (feature points such as edges) of the workpiece $W_3$ imaged by the vision sensor 112 can be expressed as coordinates in a sensor coordinate system $C_s$ set for the vision sensor 112.

In this manner, the vision sensor 112 detects the shape of the workpiece $W_3$, and transmits the acquired image data to the I/O interface 78. This image data corresponds to the information on the shape of the workpiece $W_3$.

The I/O interface 78 receives the image data from the vision sensor 112, and the CPU 72 stores the received image data in the working memory 76. Thus, in this embodiment, the I/O interface 78 functions as a shape acquisition section 114 (FIG. 11) configured to receive the information on the shape of the workpiece $W_3$.

At step S22, the CPU 72 determines the similarity between the workpiece $W_3$ detected at step S21 and the reference workpieces $W_{R3}$, $W_{R4}$, $W_{R5}$, and $W_{R6}$. This step S22 is described with reference to FIG. 14.

At step S31, the CPU 72 calculates a degree of difference $\delta_1$ between the workpiece $W_3$ detected at step S21 and a first type of reference workpiece of a plurality of types of the reference workpieces $W_{R3}$, $W_{R4}$, $W_{R5}$, and $W_{R6}$ stored in the system memory 74. The degree of difference $\delta$ can be calculated by the following equation 2.

$$\delta = \sum_k \left\| f(x^{(k)}) - x^{(k)\prime} \right\|^2 + \int_{x_1}\int_{x_2}\left[\left(\frac{\partial^2 f}{\partial x_1^2}\right)^2 + 2\left(\frac{\partial^2 f}{\partial x_1 \partial x_2}\right)^2 + \left(\frac{\partial^2 f}{\partial x_2^2}\right)^2\right]dx_1 dx_2 \quad \text{Equation 2}$$

The equation 2 corresponds to term E in the above described equation 1. The degree of difference $\delta$ calculated by the equation 2 is a parameter representing a degree of difference between two shapes, and means that smaller the degree of difference is, more similar the two shapes are.

Figure 16:
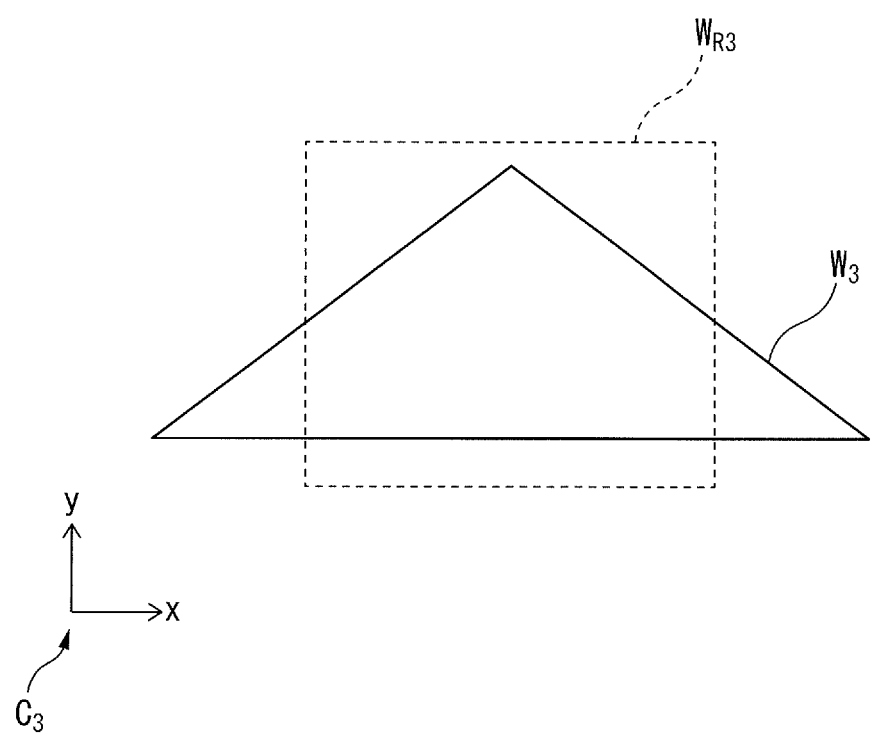
FIG. 16 illustrates an example of an image of a workpiece and a first type of reference workpiece plotted on a coordinate system.

Assume that the rectangular reference workpiece $W_{R3}$ illustrated in FIG. 12 is set as the first type of reference workpiece. In this case, the CPU 72 plots the shape (feature points) of the workpiece $W_3$ expressed as the coordinates in the sensor coordinate system $C_s$ in a coordinate system $C_3$ illustrated in FIG. 16, based on the image data of the workpiece $W_3$ acquired at step S21.

Together with this, the CPU 72 plots the shape of the reference workpiece $W_{R3}$ in the coordinate system $C_3$ so as to be superimposed on the workpiece $W_3$, based on the drawing data of the reference workpiece $W_{R3}$ stored in the system memory 74.

The degree of difference $\delta_1$ between the workpiece $W_3$ and the reference workpiece $W_{R3}$ can be calculated from the equation 2 by substituting the coordinates of the feature points of the workpiece $W_3$ into $f(x^{(k)})$ in the equation 2, and substituting the coordinates of the feature points of the reference workpiece $W_{R3}$ into $x^{(k)\prime}$ in the equation 2. In the example illustrated in FIG. 16, the degree of difference $\delta_1 \approx 6.2 \times 10^{-4}$.

At step S32, the CPU 72 determines whether the degree of difference $\delta_1$ calculated at step S31 is equal to or less than a threshold value $\alpha$. The threshold value $\alpha$ is predetermined by a user and is stored in the system memory 74.

When the CPU 72 determines that the degree of difference $\delta_1$ is equal to or less than the threshold value $\alpha$ (i.e., determines YES), the process advances to step. S33. On the other hand, when the CPU 72 determines that the degree of difference $\delta_1$ is larger than the threshold value $\alpha$ (i.e., determines NO), the process advances to step S34.

For example, the threshold value $\alpha$ is set to $\alpha=4.5 \times 10^{-4}$. In this case, if the degree of difference $\delta_1$ between the workpiece $W_3$ and the reference workpiece $W_{R3}$ is calculated at step S31 (i.e., $\delta \approx 6.2 \times 10^{-4}$), the CPU 72 determines NO and the process advances to step S34, since $\delta_1 > \alpha$.

At step S34, the CPU 72 calculates a degree of difference $\delta_2$ between the workpiece $W_3$ detected at step S21 and the second type of reference workpiece of the plurality types of reference workpieces $W_{R3}$, $W_{R4}$, $W_{R5}$, and $W_{R6}$ stored in the system memory 74.

Figure 17:
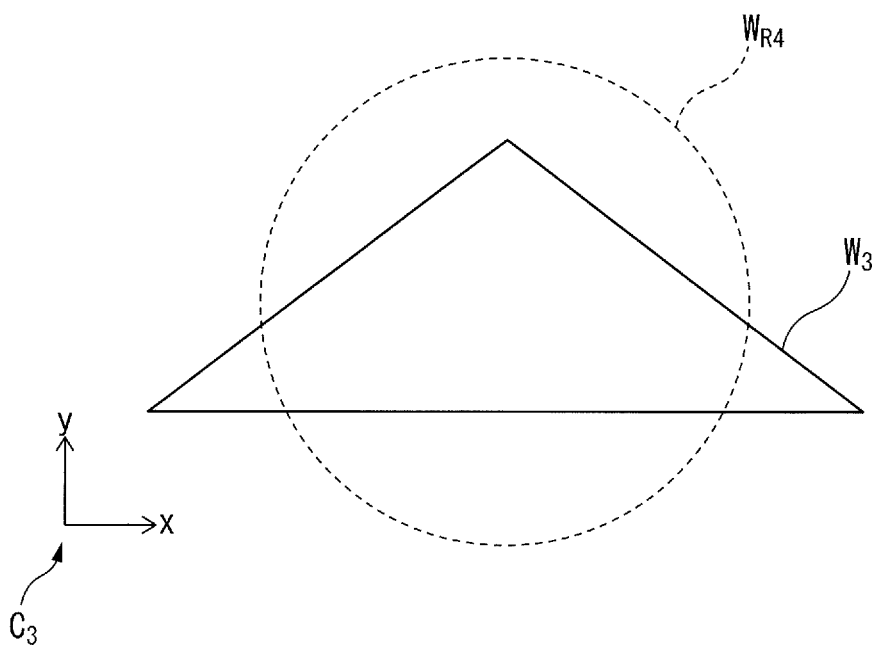
FIG. 17 illustrates an example of an image of a workpiece and a second type of reference workpiece plotted on a coordinate system.

For example, assume that the circular reference workpiece $W_{R4}$ illustrated in FIG. 12 is set as the second type of reference workpiece. In this case, as illustrated in FIG. 17, the CPU 72 plots the shape of the workpiece $W_3$ at step S21 and the shape of the reference workpiece $W_{R4}$ in the coordinate system $C_3$. Then, the CPU 72 calculates the degree of difference $\delta_2$ between the workpiece $W_3$ and the reference workpiece $W_{R4}$ with using the equation 2. In the example illustrated in FIG. 17, the degree of difference $\delta_2 \approx 6.7 \times 10^{-4}$.

At step S35, the CPU 72 determines whether the degree of difference $\delta_2$ calculated at step S34 is equal to or less than a threshold value $\alpha$. When the CPU 72 determines that the degree of difference $\delta_2$ is equal to or less than the threshold value $\alpha$ (i.e., determines YES), the process advances to step S33. On the other hand, when the CPU 72 determines that the degree of difference $\delta_2$ is larger than the threshold value $\alpha$ (i.e., determines NO), the process advances to step S36.

For example, if the threshold value $\alpha$ is set to $\alpha=4.5 \times 10^{-4}$ and the degree of difference $\delta_2$ between the workpiece $W_3$ and the reference workpiece $W_{R4}$ is calculated at step S34 (i.e., $\delta_2 \approx 6.7 \times 10^{-4}$), the CPU 72 determines NO and the process advances to step S36, since $\delta_2 > \alpha$.

At step S36, the CPU 72 calculates the degree of difference $\delta_3$ between the workpiece $W_3$ detected at step S21 and the third type of reference workpiece of the plurality types of reference workpieces $W_{R3}$, $W_{R4}$, $W_{R5}$, and $W_{R6}$ stored in the system memory 74.

Figure 18:
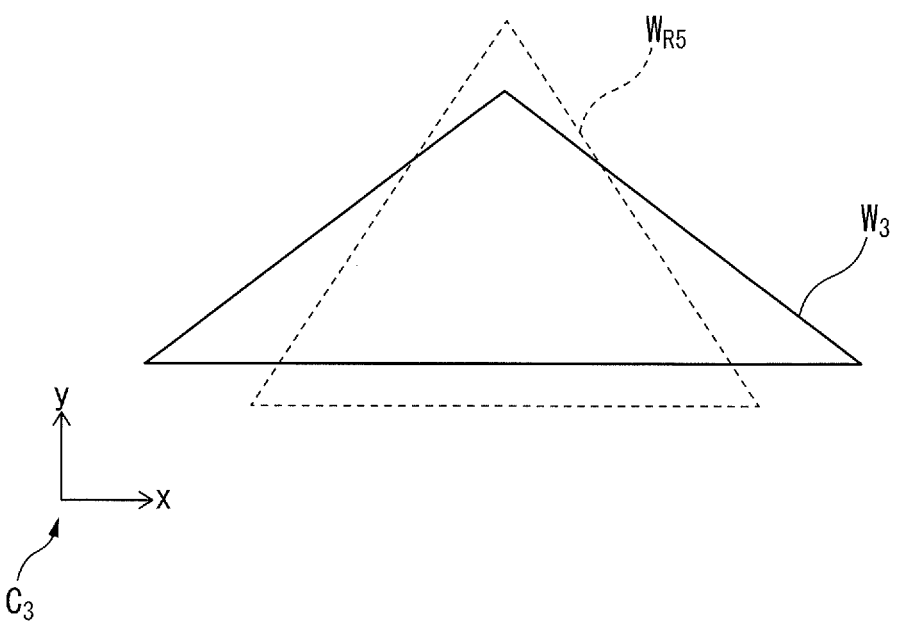
FIG. 18 illustrates an example of an image of a workpiece and a third type of reference workpiece plotted on a coordinate system.

For example, assume that the triangular reference workpiece $W_{R5}$ illustrated in FIG. 12 is set as the third type of reference workpiece. In this case, as illustrated in FIG. 18, the CPU 72 plots the shape of the workpiece acquired at step S21 and the shape of the reference workpiece $W_{R5}$ in the coordinate system $C_3$. Then the CPU 72 calculates a degree of difference $\delta_3$ between the workpiece $W_3$ and the reference workpiece $W_{R5}$ with using the equation 2. In the example illustrated in FIG. 18, the degree of difference $\delta_3 \approx 4.1 \times 10^{-4}$.

At step S37, the CPU 72 determines whether the degree of difference $\delta_3$ calculated at step S36 is equal to or less than the threshold value $\alpha$. When the CPU 72 determines that the degree of difference $\delta_3$ is equal to or less than the threshold value $\alpha$ (i.e., determines YES), the process advances to step S33. On the other hand, when the CPU 72 determines that the degree of difference $\delta_3$ is larger than the threshold value $\alpha$ (i.e., determines NO), the process advances to step S38.

For example, if the threshold value $\alpha$ is set to $\alpha=4.5 \times 10^{-4}$ and the degree of difference $\delta_3$ between the workpiece $W_3$ and the reference workpiece $W_{R4}$ is calculated at step S36

(i.e., $\delta_3 \approx 4.1 \times 10^{-4}$), the CPU 72 determines YES and the process advances to step S33, since $\delta_3 \leq \alpha$.

At step S38, the CPU 72 calculates a degree of difference $\delta_4$ between the workpiece $W_3$ detected at step S21 and the fourth type of reference workpiece of the plurality types of reference workpieces $W_{R3}$, $W_{R4}$, $W_{R5}$, and $W_{R6}$ stored in the system memory 74.

For example, assume that the linear reference workpiece $W_{R6}$ illustrated in FIG. 12 is set as the fourth type of reference workpiece. In this case, the CPU 72 calculates the degree of difference $\delta_4$ between the workpiece $W_3$ and the reference workpiece $W_{R6}$ with using the above described calculation method.

At step S39, the CPU 72 determines whether the degree of difference $\delta_4$ calculated at step S38 is equal to or less than the threshold value $\alpha$. When the CPU 72 determines that the degree of difference $\delta_4$ is equal to or less than the threshold value $\alpha$ (i.e., determines YES), the process advances to step S33. On the other hand, when the CPU 72 determines that the degree of difference $\delta_4$ is larger than the threshold value $\alpha$ (i.e., determines NO), the process advances to step S26 in FIG. 13.

At step S33, the CPU 72 determines that the shape of the workpiece $W_3$ is similar to the reference workpiece shape of the reference workpiece $W_{R3}$, $W_{R4}$, $W_{R5}$ or $W_R$ that corresponds to the degree of difference $\delta_1$, $\delta_2$, $\delta_3$ or $\delta_4$ obtained by determining YES at step S32, 35, 37 or 39.

If the workpiece $W_3$ illustrated in FIG. 15 is detected at step S21, since the CPU 72 determines YES at step S37, the CPU 72 determines that the shape of the workpiece $W_3$ is similar to the reference workpiece shape of the reference workpiece $W_{R5}$ and reads out the drawing data of the reference workpiece $W_{R5}$ from the system memory 74. Then, the CPU 72 proceeds to step S23 in FIG. 13.

Thus, this embodiment, the CPU 72 functions as a similarity determination section 117 (FIG. 11) configured to determine whether the shape of the workpiece $W_3$ received by the shape acquisition section 114 is similar to the reference workpiece shape of the reference workpiece $W_{R3}$, $W_{R4}$, $W_{R5}$ or $W_{R6}$.

The CPU 72 determines that the detected workpiece $W_3$ is similar to the reference workpiece $W_{R3}$, $W_{R4}$, $W_{R5}$ or $W_{R6}$, in accordance with a predetermined rule. The predetermined rule in this embodiment is that a shape of a workpiece is determined to be similar to a reference workpiece shape when the degree of difference $\delta$ calculated by the equation 2 is equal to or less than the threshold value $\alpha$.

When step S33 is ended, the CPU 72 generates image data of a work input screen enabling a user to select a work, and displays it on the display 80. In the screen displayed on the display 80 at this time, an image enabling the user to select one of three types of works, i.e., "Gripping," "Spot welding," or "Arc welding" illustrated in FIG. 12, is shown.

The user can select "Gripping," "Spot welding," or "Arc welding" by operating the input section 82, while viewing the work input screen displayed on the display 80. Thus, in this embodiment, the input section 82 functions as the work input section 116 (FIG. 11) configured to receive the input of the type of work.

The input section 82 transmits a work input data input by the user to the I/O interface 78. The I/O interface 78 receives from the input section 82 the work input data, and the CPU 72 stores the received work input data in the working memory 76.

With reference to FIG. 13 again, at step S23, the CPU 72 determines whether it receives the input of the work. Specifically, the CPU 72 determines whether the I/O interface 78 receives the work input data from the input section 82.

When the CPU 72 determines that the I/O interface 78 receives the work input data (i.e., determines YES), the process advances to step S24. On the other hand, when the CPU 72 determines that the I/O interface 78 does not receive the work input data (i.e., determines NO), it loops step S23.

At step S24, the CPU 72 determines working positions in the workpiece $W_3$ that correspond to the reference working positions in the reference workpiece $W_{R5}$ determined to be similar at step S33. For example, assume that the selection of the work "Spot welding" is received at step S23.

In this case, the CPU 72 substitutes the coordinates in the coordinate $C_3$ (FIG. 18) of the reference workpiece $W_{R5}$ determined to be similar to the workpiece $W_3$ at step S33 and the coordinates in the coordinate $C_3$ of the workpiece $W_3$ into the above described equation 1, thereby calculates working positions $F_1'$ to $F_3'$ in the workpiece $W_3$ that respectively correspond to the working positions $F_1$ to $F_3$ included in the basic motion patterns 144 illustrated in FIG. 12.

Figure 19:
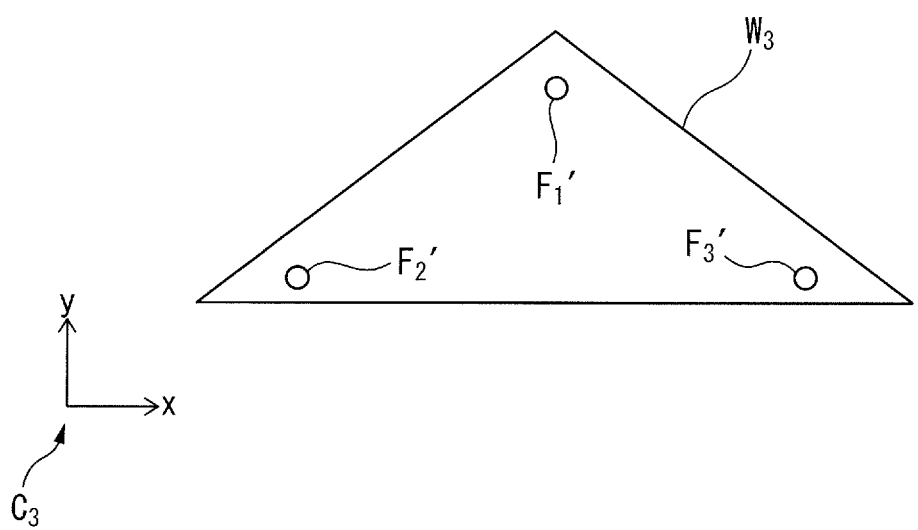
FIG. 19 is a drawing illustrating the working position, calculated by the position determination section illustrated in FIG. 11, on the workpiece illustrated in FIG. 15.

FIG. 19 illustrates the thus-calculated working positions $F_1'$ to $F_3'$. Thus, in this embodiment, the CPU 72 functions as a position determination section 118 (FIG. 11) configured to determine the working positions $F_1'$ to $F_3'$ in the workpiece $W_3$ that correspond to the working positions $F_1$ to $F_3$ in the reference workpiece $W_{R5}$.

At step S25, the CPU 72 generates a motion path. Specifically, the CPU 72 changes the information on the reference working positions $F_1$ to $F_3$ (the coordinates in robot coordinate system $C_R$) included in the basic motion patterns 144 to the working positions $F_1'$ to $F_3'$ (the coordinates in robot coordinate system $C_R$) determined at step S24.

When this step S25 is carried out after step S7, the CPU 72 changes the reference order (e.g., $F_1 \rightarrow F_2 \rightarrow F_3$) included in the basic motion patterns 144 to the order (e.g., $F_3 \rightarrow F_2 \rightarrow F_1$) determined at step S7. On the other hand, when this step S25 is carried out after determining NO at step S6, the CPU 72 maintains the setting of the reference order included in the basic motion patterns 144.

In this manner, the CPU 72 automatically generates the motion path for causing the robot 34 to carry out the work received from the user at step S23 onto the working positions $F_1'$ to $F_3'$, in the order designated by the user or in the reference order.

Thus, in this embodiment, the CPU 72 functions as a motion-path generation section 120 (FIG. 11) configured to generate the motion path for the robot 34 to carry out the work onto the working positions $F_1'$ to $F_3'$.

When it is determined NO at step S10, at step S27, the CPU 72 receives the input for correcting the motion path displayed at step S9. Specifically, the CPU 72 generates image data of a correction input screen enabling the user to change the motion path displayed on the display 80 step S9, and displays it on the display 80.

The user corrects the motion path by operating the input section 82 while viewing the correction input screen displayed on the display 80. The CPU 72 receives the correction input data from the input section 82 via the I/O interface 78, and corrects the motion path in accordance with the correction input data.

Figure 14:
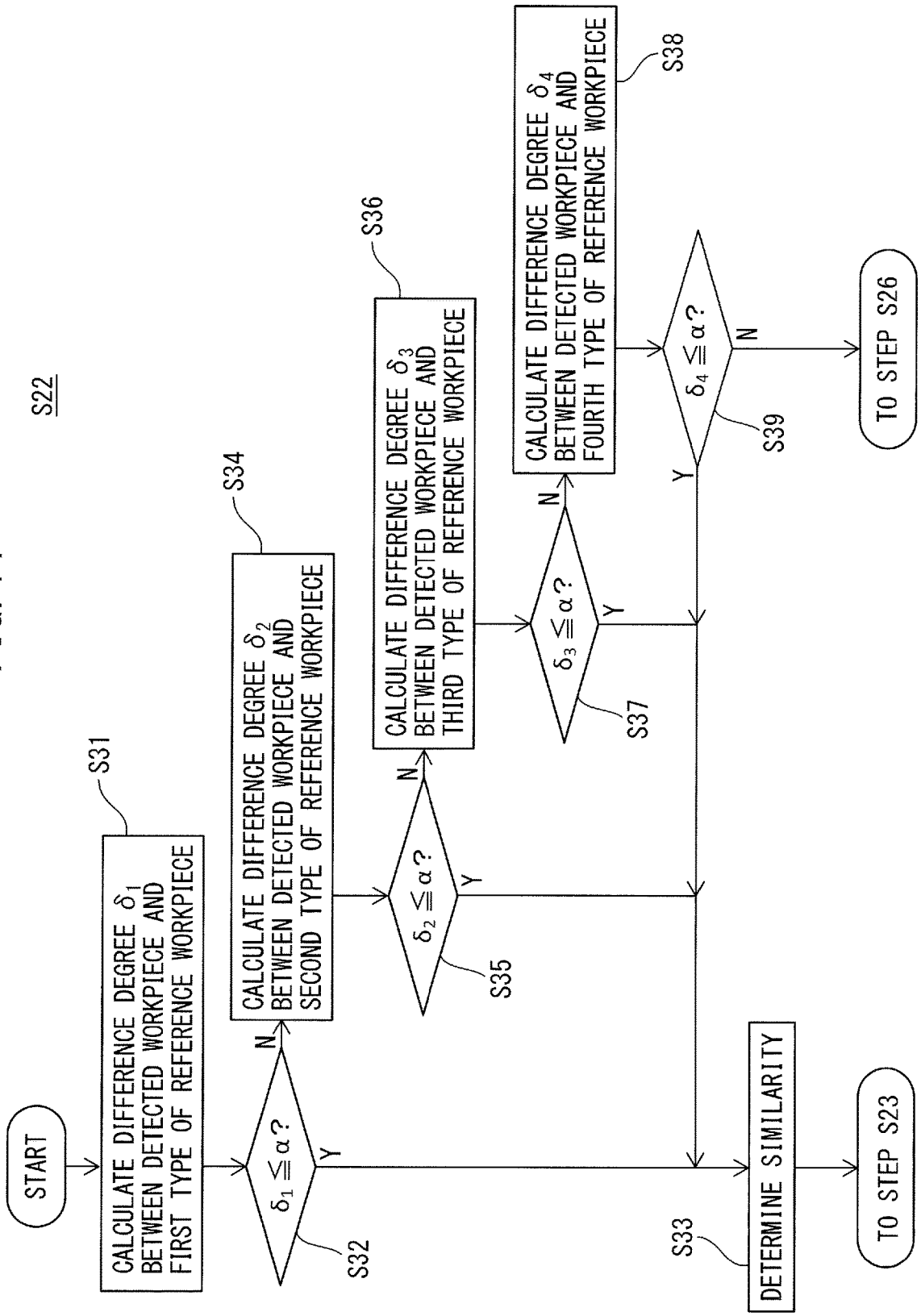
FIG. 14 is a flowchart representing one example of a flow of step S22 in FIG. 13.

When it is determined NO at step S39 in FIG. 14, at step S26, the CPU 72 displays a warning. For example, the CPU 72 generates warning image data representing the warning that "Shape of detected workpiece is not similar to any of reference workpiece shapes." Then the CPU 72 causes the display 80 to display the generated warning image data.

Alternatively, the CPU 72 may generate the warning signal in the form of a sound signal, and output it as the sound through a speaker (not illustrated) provided at the device 110.

According to this embodiment, it is possible to automatically structure the motion path for the robot 34 to carry out the work onto the workpiece $W_3$ by making use of the basic motion patterns 144, without teaching the robot 34 again. According to this configuration, since the work for re-teaching the robot 34 can be reduced, the efficiency of the manufacturing line can be improved.

In this embodiment, the device 110 includes the vision sensor 112 able to detect the shape of the workpiece. According to this configuration, it is possible to calculate the working positions $F_1'$ to $F_3'$ that correspond to the working positions $F_1$ to $F_3$ even for the workpiece $W_3$ whose shape is unknown.

In this embodiment, the CPU 72 calculates the degree of difference δ and determines the similarity between the workpiece $W_3$ and the reference workpieces $W_{R3}$, $W_{R4}$, $W_{R5}$, and $W_{R6}$ based on the degree of difference δ. According to this configuration, it is possible to determine the similarity between the workpiece $W_3$ and the reference workpieces $W_{R3}$, $W_{R4}$, $W_{R5}$, and $W_{R6}$, more precisely and automatically.

Note that, instead of the degree of difference δ, it is possible to use another parameter for determining the similarity between the detected workpiece $W_3$ and the reference workpieces $W_{R3}$, $W_{R4}$, $W_{R5}$, and $W_{R6}$. For example, it is possible to use the degree of similarity representing the similarity degree between the two shapes.

The degree of similarity is a parameter that can be calculated by a certain algorithm with using the number of apexes (or sides), the angles of the apexes (or side), occupied areas of two shapes, and means that larger this value is, similar the two shapes are.

Accordingly, when the degree of similarity is used, the CPU 72 calculates the degree of similarity at steps S31, S34, S36, and S38 in FIG. 14, and determines whether the degree of similarity is equal to or greater than a predetermined threshold value β at steps 32, 35, 37, and 39.

When the CPU 72 determines that the degree of similarity is equal to or greater than the threshold value β (i.e., determines YES), the process advances to step S33. On the other hand, when the CPU 72 determines that the degree of similarity is less than the threshold value β (i.e., determines NO), the process advances to step S34, 36, or 38.

Figure 20:
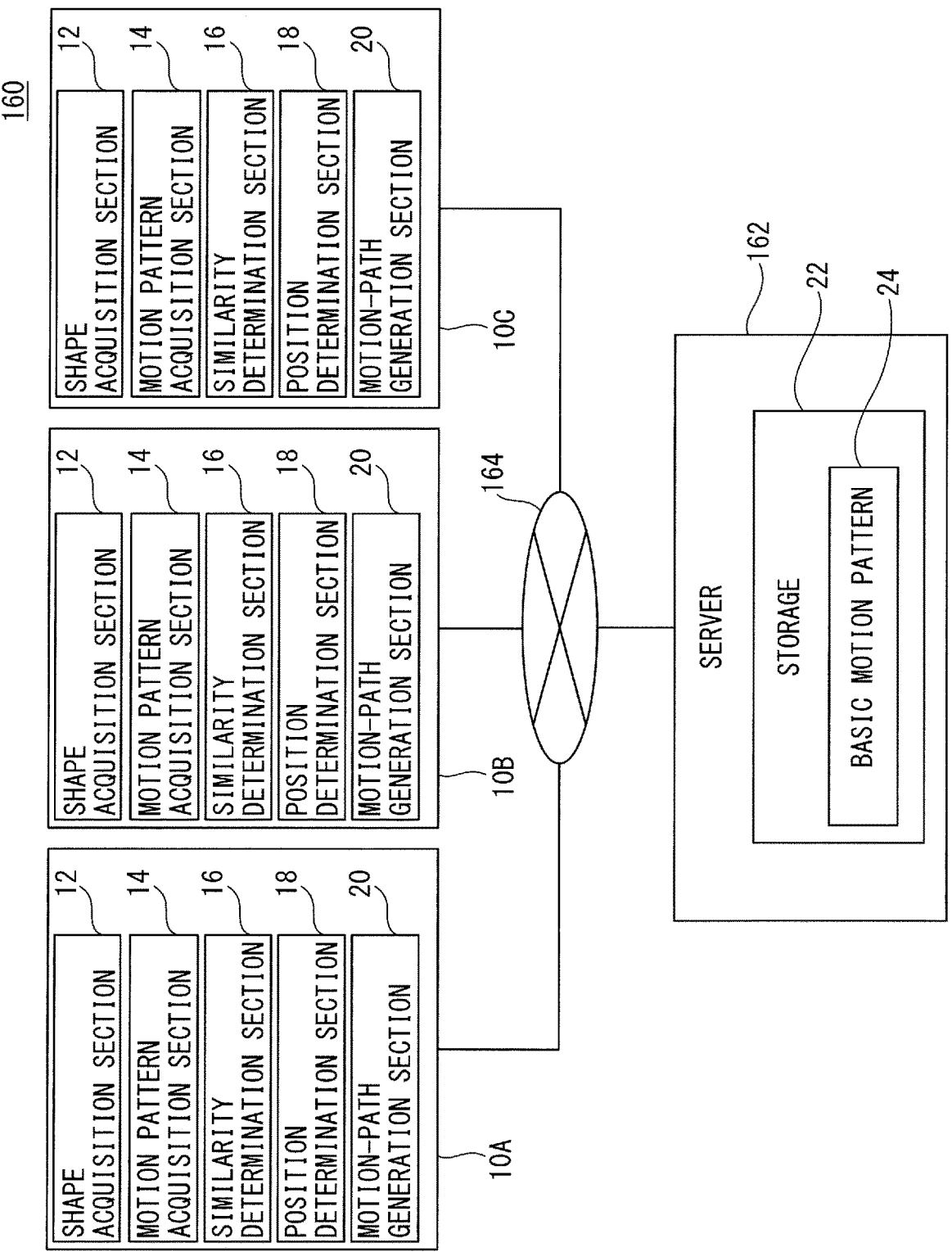
FIG. 20 is a block diagram of a system according to one embodiment.

Note that, in the embodiment illustrated in FIG. 1, the storage 22 may be built in a server provided outside of the device 10. FIG. 20 illustrates such an embodiment. A system 160 illustrated in FIG. 20 includes devices 10A, 10B and 10C, and a server 162.

Each of the devices 10A, 10B and 10C includes the shape acquisition section 12, the motion pattern acquisition section 14, the similarity determination section 16, the position determination section 18, and the motion-path generation section 20, similarly to the above described device 10. Each of the devices 10A, 10B, and 10C is communicably connected to the server 162 via a communication network 164.

The storage 22 that stores the basic motion pattern 24 is built in the server 162. The communication network 164 is e.g. Internet or an LAN such as intranet.

As an example, the devices 10A, 10B, and 10C are respectively installed in different factories. The motion pattern acquisition section 14 of each of the devices 10A, 10B, and 10C downloads and acquires the basic motion pattern 24 from the server 162 via the communication network 164.

Based on the above described method, the devices 10A, 10B, and 10C generate the motion path by making use of the basic motion pattern 24. According to this configuration, the factories in different places can share the basic motion pattern 24.

Note that in the above described device 70, 100, or 110, the basic motion patterns may be stored in the storage 22 built in the above described server 162, instead of the system memory 74. In this case, the I/O interface 78 may be communicably connected to the server 162 via the communication network 164.

In the above described embodiments, a plurality of reference working positions are set in each of the reference workpieces $W_{R1}$, $W_{R2}$, $W_{R3}$, $W_{R4}$, $W_{R5}$, and $W_{R6}$. However, a single reference working position may be set at one position.

Further, the above described device 10, 10A, 10B, 10C, 70, 100, or 110 may be incorporated in the robot controller 32 of the robot system. 30, or may be provided as a component different from the robot controller 32.

In the flow illustrated in FIG. 9, the CPU 72 may carry out step 27 in FIG. 13 after determining NO at step S10, and then, proceed to step S9. Further, features of the above described various embodiments may be combined.

Through the embodiment, the present disclosure has been described above, but the above described embodiments do not limit the invention according to CLAIMS.

The invention claimed is:

1. A device configured to automatically generate a motion path of a robot, comprising:

a shape acquisition section configured to acquire a shape of a workpiece to be processed by a robot;

a motion pattern acquisition section configured to acquire a basic motion pattern including a reference workpiece shape, a reference working position in the reference workpiece shape, and a type of work onto the reference working position;

a similarity determination section configured to determine whether the shape of the workpiece acquired by the shape acquisition section is similar to the reference workpiece shape included in the basic motion pattern;

a position determination section configured to newly calculate a working position in the workpiece that corresponds to the reference working position included in the basic motion pattern, using information representing the shape of the workpiece and the reference workpiece shape determined to be similar to each other by the similarity determination section, and a mapping theory equation for calculating corresponding positions in two shapes having different dimensions; and a motion-path generation section configured to generate a motion path for the robot to carry out the work included in the basic motion pattern onto the working position, by changing the reference working position to the working position calculated by the position determination section, wherein the mapping theory equation is represented as:

$$f = \operatorname{argmin}_f \frac{\sum_k \|f(x^{(k)}) - x^{(k)\prime}\|^2 + \int_{x_1}\int_{x_2}\left[\left(\frac{\partial f}{\partial x_1^2}\right)^2 + 2\left(\frac{\partial^2 f}{\partial x_1 x_2}\right)^2 + \left(\frac{\partial^2 f}{\partial x_2^2}\right)^2\right]dx_1 dx_2}{E}$$

wherein:
x is the reference working position in the reference workpiece shape,
k is an index value of the reference working position in the reference workpiece shape,
f is the corresponding positions in the two shapes having different dimensions, and
argmin is the minimum value.

2. The device according to claim 1, further comprising:
a shape input section configured to receive an input of the shape of the workpiece and transmit it to the shape acquisition section;
a vision sensor configured to detect the shape of the workpiece and transmit it to the shape acquisition section; or
a mark read sensor configured to read a mark indicative of the shape of the workpiece and transmit it to the shape acquisition section.

3. The device according to claim 1, wherein the basic motion pattern includes a plurality of the reference working positions,
wherein the position determination section calculates a plurality of the working positions in the workpiece that correspond to the plurality of reference working positions, respectively.

4. The device according to claim 3, further comprising an order input section configured to receive an input of an order for carrying out the work onto the plurality of working positions calculated by the position determination section,
wherein the basic motion pattern includes a reference order that defines an order for carrying out the work onto the plurality of reference working positions,
wherein the motion-path generation section generates the motion path for the robot to carry out the work onto the plurality of working positions in the order received by the order input section, by changing the plurality of reference working positions to the plurality of working positions calculated by the position determination section, and changing the reference order to the order received by the order input section.

5. The device according to claim 1, wherein the motion pattern acquisition section acquires a plurality of types of the basic motion patterns respectively including a plurality of types of the reference workpiece shapes different from each other,
wherein the similarity determination section determines whether the shape of the workpiece is similar to any of the plurality of types of reference workpiece shapes, in accordance with a predetermined rule,
wherein the motion-path generation section generates the motion path by changing the reference working position included in the basic motion pattern of the plurality of types of basic motion patterns, that includes the reference workpiece shape determined to be similar by the similarity determination section.

6. The device according to claim 1, wherein the motion pattern acquisition section acquires a plurality of types of the basic motion patterns respectively including a plurality of types of the works different from each other,
wherein the device further comprises a work input section configured to receive an input of the type of work,
wherein the motion-path generation section generates the motion path by changing the reference working position included in the basic motion pattern of the plurality of types of basic motion patterns, that includes the type of work received by the work input section.

7. A system comprising:
the device according to claim 1; and
a server communicably connected to the device via a communication network, wherein the basic motion pattern is stored in the server.

8. A method of automatically generating a motion path of a robot, comprising:
acquiring a shape of a workpiece to be processed by a robot;
acquiring a basic motion pattern including a reference workpiece shape, a reference working position in the reference workpiece shape, and a type of work onto the reference working position;
determining whether the acquired shape of the workpiece is similar to the reference workpiece shape included in the basic motion pattern;
newly calculating a working position in the workpiece that corresponds to the reference working position included in the basic motion pattern, using information representing the shape of the workpiece and the reference workpiece shape determined to be similar to each other, and a mapping theory equation for calculating corresponding positions in two shapes having different dimensions; and
generating a motion path for the robot to carry out the work included in the basic motion pattern onto the working position, by changing the reference working position to the calculated working position,
wherein the mapping theory equation is represented as:

$$f = \operatorname{argmin}_f \frac{\sum_k \|f(x^{(k)}) - x^{(k)\prime}\|^2 + \int_{x_1}\int_{x_2}\left[\left(\frac{\partial f}{\partial x_1^2}\right)^2 + 2\left(\frac{\partial^2 f}{\partial x_1 x_2}\right)^2 + \left(\frac{\partial^2 f}{\partial x_2^2}\right)^2\right]dx_1 dx_2}{E}$$

wherein:
x is the reference working position in the reference workpiece shape,
k is an index value of the reference working position in the reference workpiece shape,
f is the corresponding positions in the two shapes having different dimensions, and
argmin is the minimum value.

* * * * *

UNITED STATES PATENT AND TRADEMARK OFFICE
CERTIFICATE OF CORRECTION

PATENT NO. : 10,814,485 B2  
APPLICATION NO. : 15/947281  
DATED : October 27, 2020  
INVENTOR(S) : Kaimeng Wang, Wenjie Chen and Kouichirou Hayashi Page 1 of 1

It is certified that error appears in the above-identified patent and that said Letters Patent is hereby corrected as shown below:

In the Claims

Claim 1, Column 21, Line 5: delete the existing equation and insert:

$$f = \arg\min_f \underbrace{\sum_k \|f(x^{(k)}) - x^{(k)'}\|^2 + \int_{x_1}\int_{x_2}[(\frac{\partial^2 f}{\partial x_1^2})^2 + 2(\frac{\partial^2 f}{\partial x_1 \partial x_2})^2 + (\frac{\partial^2 f}{\partial x_2^2})^2]dx_1 dx_2}_{E}$$

Claim 8, Column 22, Line 47: delete the existing equation and insert:

$$f = \arg\min_f \underbrace{\sum_k \|f(x^{(k)}) - x^{(k)'}\|^2 + \int_{x_1}\int_{x_2}[(\frac{\partial^2 f}{\partial x_1^2})^2 + 2(\frac{\partial^2 f}{\partial x_1 \partial x_2})^2 + (\frac{\partial^2 f}{\partial x_2^2})^2]dx_1 dx_2}_{E}$$

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*